United States Patent
Horita

(10) Patent No.: US 11,107,240 B2
(45) Date of Patent: Aug. 31, 2021

(54) SELF POSITION ESTIMATION DEVICE, SELF POSITION ESTIMATION METHOD, PROGRAM, AND IMAGE PROCESSING DEVICE

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/362,376

(22) Filed: Mar. 22, 2019

(65) Prior Publication Data

US 2019/0220998 A1    Jul. 18, 2019

Related U.S. Application Data

(63) Continuation of application No. PCT/JP2017/035014, filed on Sep. 27, 2017.

(30) Foreign Application Priority Data

Oct. 7, 2016   (JP) .............................. JP2016-199239
Sep. 8, 2017   (JP) .............................. JP2017-173283

(51) Int. Cl.
*G06T 7/73*    (2017.01)
*G06T 3/40*    (2006.01)
(Continued)

(52) U.S. Cl.
CPC ................ *G06T 7/74* (2017.01); *G01C 15/00* (2013.01); *G05D 1/0094* (2013.01); *G05D 1/02* (2013.01);
(Continued)

(58) Field of Classification Search
CPC .......... G06T 7/74; G06T 7/70; G06T 3/4038; G06T 2207/10012; G06T 2207/30244;
(Continued)

(56) References Cited

U.S. PATENT DOCUMENTS

| 8,908,054 B1 * | 12/2014 | Koenck ............ H04N 5/232123 |
| | | 348/218.1 |
| 2003/0107586 A1 * | 6/2003 | Takiguchi ............. G06T 3/4038 |
| | | 345/629 |

(Continued)

FOREIGN PATENT DOCUMENTS

| JP | 2006-220521 A | 8/2006 |
| JP | 2013-025401 A | 2/2013 |

(Continued)

OTHER PUBLICATIONS

Extended European Search Report issued by the European Patent Office dated Sep. 19, 2019, which corresponds to EP17858273.0—1207 and is related to U.S. Appl. No. 16/362,376.

(Continued)

*Primary Examiner* — Nasim N Nirjhar
(74) *Attorney, Agent, or Firm* — Studebaker & Brackett PC

(57) ABSTRACT

Disclosed are a self position estimation device, a self position estimation method, a program, and an image processing device that suppress imaging and movement other than a work purpose of a robot, do not need a landmark, and do not need special imaging equipment for application of the robot other than the work purpose. A self position estimation device (400) includes a first structure image acquisition unit (401) that acquires a plurality of structure images including a first structure image and a second structure image, a panorama composition unit (403) that generates a panorama composite image by subjecting the plurality of structure images including the first structure image and the second structure image to panorama composition, a first image coordinate acquisition unit (405) that acquires second image coordinates as coordinates of a specific position of the second structure image, and a first relative position coordinate calculation unit (407) that calculates relative position (Continued)

coordinates as relative actual coordinates of a second position as a relative self position using a transformation coefficient for transformation from an image coordinate system to an actual coordinate system.

20 Claims, 18 Drawing Sheets

(51) Int. Cl.
| | |
|---|---|
| H04N 5/232 | (2006.01) |
| G05D 1/02 | (2020.01) |
| G05D 1/00 | (2006.01) |
| G06K 9/00 | (2006.01) |
| G06T 7/70 | (2017.01) |
| G01C 15/00 | (2006.01) |

(52) U.S. Cl.
CPC ........ *G06K 9/00664* (2013.01); *G06T 3/4038* (2013.01); *G06T 7/70* (2017.01); *H04N 5/23238* (2013.01); *G06T 2207/10012* (2013.01); *G06T 2207/30244* (2013.01)

(58) Field of Classification Search
CPC .............. G06K 9/00664; G01C 15/00; H04N 5/23238; G05D 1/02; G05D 1/0094
See application file for complete search history.

(56) References Cited

U.S. PATENT DOCUMENTS

| | | | |
|---|---|---|---|
| 2006/0177101 A1 | 8/2006 | Kato et al. | |
| 2009/0021576 A1* | 1/2009 | Linder | G03B 37/00 |
| | | | 348/36 |
| 2010/0232681 A1* | 9/2010 | Fujieda | G06T 7/85 |
| | | | 382/154 |
| 2015/0036888 A1* | 2/2015 | Weisenburger | G06T 7/80 |
| | | | 382/107 |
| 2016/0253808 A1* | 9/2016 | Metzler | G05D 1/0094 |
| | | | 382/103 |
| 2016/0286137 A1* | 9/2016 | Marks | H04N 5/23238 |
| 2017/0214836 A1* | 7/2017 | Tamegai | H04N 5/23238 |
| 2018/0082432 A1* | 3/2018 | Ishikawa | A61B 5/02438 |
| 2018/0272231 A1* | 9/2018 | Katoh | A63F 13/213 |

FOREIGN PATENT DOCUMENTS

| | | |
|---|---|---|
| WO | 2016/060139 A1 | 4/2016 |
| WO | 2016/060140 A1 | 4/2016 |

OTHER PUBLICATIONS

Yan Meng and Hanqi Zhuang, "Self-Calibration of Camera-Equipped Robot Manipulators", International Journal of Robotics Research, vol. 20, No. 11, Nov. 1, 2001, pp. 909-921.

International Search Report issued in PCT/JP2017/035014; dated Dec. 12, 2017.

International Preliminary Report on Patentability and Written Opinion issued in PCT/JP2017/035014; dated Apr. 9, 2019.

* cited by examiner

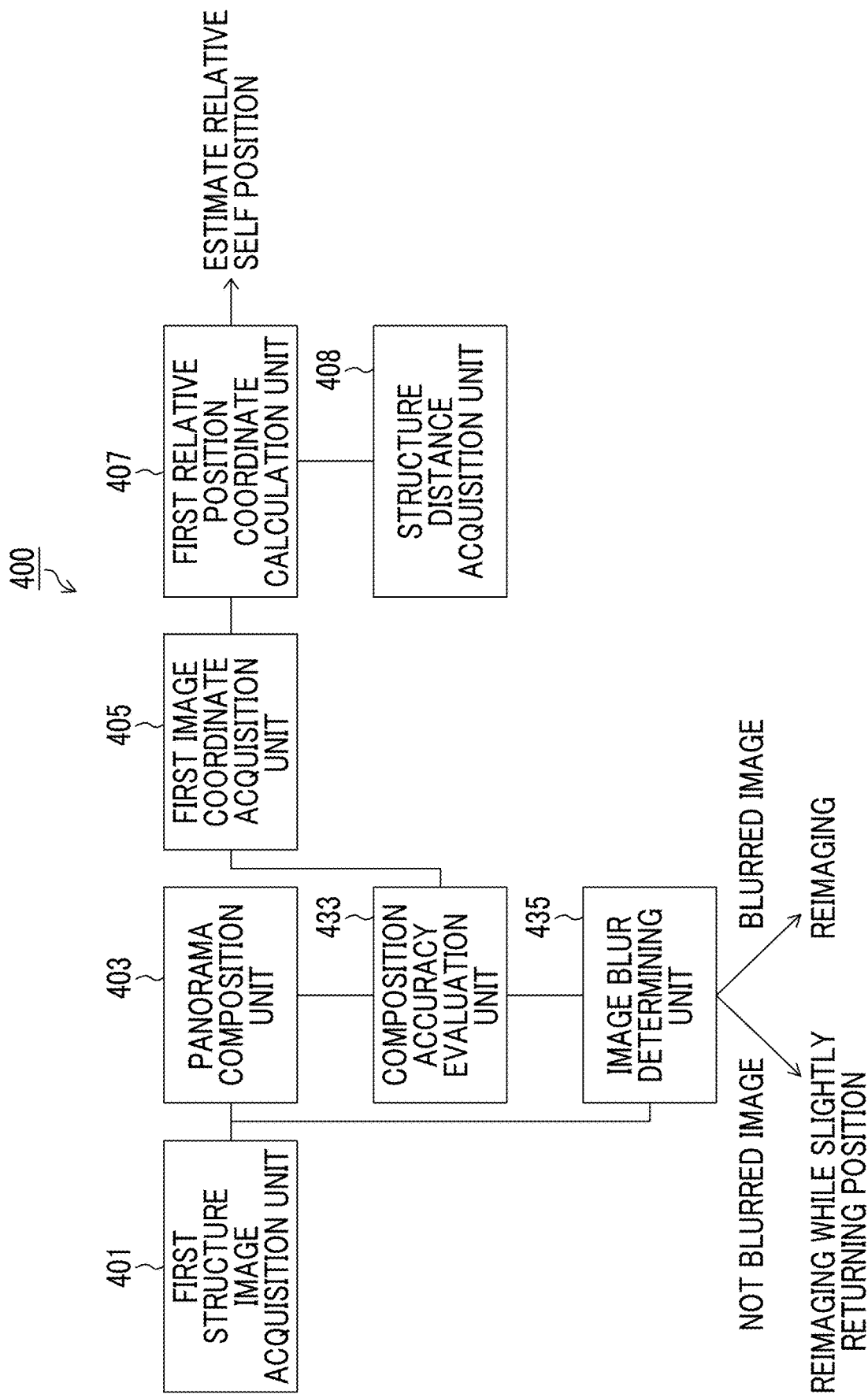

SELF POSITION ESTIMATION DEVICE, SELF POSITION ESTIMATION METHOD, PROGRAM, AND IMAGE PROCESSING DEVICE

CROSS-REFERENCE TO RELATED APPLICATIONS

The present application is a Continuation of PCT International Application No. PCT/JP2017/035014 filed on Sep. 27, 2017 claiming priority wider 35 U.S.C § 119(a) to Japanese Patent Application No. 2016-199239 filed on Oct. 7, 2016 and Japanese Patent Application No. 2017-173283 filed on Sep. 8, 2017. Each of the above applications is hereby expressly incorporated by reference, in their entirety, into the present application.

BACKGROUND OF THE INVENTION

1. Field of the Invention

The present invention relates to a self position estimation device, a self position estimation method, a program, and an image processing device, and in particular, to a self position estimation device, a self position estimation method, a program, and an image processing device that estimate a self position using a captured image.

2. Description of the Related Art

In the related art, a technique that estimates a position (self position) of a mobile object using a captured image in a mobile object has been suggested.

For example, JP2013-025401A describes a technique that generates a landmark map based on three-dimensional coordinates of a plurality of landmarks, captures an image including a landmark with a stereo camera of a robot, and compares the captured image with the landmark map to estimate a self position of the robot.

For example, JP2006-220521A describes a technique that creates omni-directional predicted images composed from omni-directional images acquired by a robot at an initial position assuming that the robot has moved from the initial position and collates the predicted images with omni-directional images newly acquired when the robot moves has actually moved to estimate a self position of the robot. The robot is mounted with a super-wide angle lens having an angle of view equal to or greater than 120°.

SUMMARY OF THE INVENTION

However, in the technique described in JP2013-025401A, the landmark map needs to be created in advance, and the robot should capture the image including the landmark. Accordingly, in the technique described in JP2013-025401A, the landmark needs to be constantly tracked, and in a case where the landmark is missed, it is not possible to perform the estimation of the self position. In the technique described in JP2013-025401A, imaging for creating the landmark map is needed, and imaging different from a purpose (for example, inspection of a structure) of a work of the robot may be needed.

In the technique described in JP2006-220521A, the robot should capture the omni-directional images at the initial position. Then, the robot needs to be mounted with a super-wide angle lens, and imaging and equipment other than application for the work purpose of the robot are needed.

The invention has been accomplished in consideration of such a situation, and an object of the invention is to provide a self position estimation device, a self position estimation method, a program, and an image processing device that suppress imaging and movement other than a work purpose of a robot, do not need a landmark, and do not need special imaging equipment for application other than the work purpose of the robot.

In order to achieve the above-described object, an aspect of the invention provides a self position estimation device that estimates a self position of a camera-equipped mobile robot performing inspection of a structure by subjecting the structure to split imaging. The self position estimation device comprises a first structure image acquisition unit that acquires a plurality of structure images including at least a first structure image obtained by subjecting the structure to split imaging at a first position with the camera-equipped mobile robot and a second structure image obtained by subjecting the structure to split imaging at a second position with the camera-equipped mobile robot after the camera-equipped mobile robot moves from the first position, a panorama composition unit that generates a panorama composite image by subjecting the plurality of structure images including the first structure image and the second structure image to panorama composition, a first image coordinate acquisition unit that acquires second image coordinates as coordinates of a specific position of the second structure image with first image coordinates corresponding to the first position in the panorama composite image as an origin of a coordinate system of the panorama composite image, and a first relative position coordinate calculation unit that calculates relative position coordinates as relative actual coordinates of the second position as a relative self position using a transformation coefficient for transforming the second image coordinates from an image coordinate system to an actual coordinate system.

According to the aspect, in the inspection of the structure as a work purpose of the camera-equipped mobile robot, the self position is estimated using the first structure image and the second structure image captured by the camera-equipped mobile robot, and the panorama image including the first structure image and the second structure image. With this, in the aspect, it is possible to perform the self position estimation while suppressing imaging and movement other than the inspection of the structure as the work purpose of the camera-equipped mobile robot without needing a landmark and without needing imaging equipment for application other than the inspection of the structure.

Preferably, the self position estimation device further comprises a second structure image acquisition unit that makes the camera-equipped mobile robot move to a third position as any position in the panorama composite image where a structure image is to be captured and acquires a third structure image obtained by subjecting the structure to split imaging at the third position, a second image coordinate acquisition unit that collates the third structure image with the panorama composite image to acquire third image coordinates as coordinates of a specific position of the third structure image with the first image coordinates as the origin of the coordinate system of the panorama composite image, and a second relative position coordinate calculation unit that transforms the third image coordinates using the transformation coefficient from the image coordinate system to the actual coordinate system to calculate relative position coordinates as relative position coordinates of the third position as a relative self position.

According to the aspect, the self position of the camera-equipped mobile robot is estimated from the panorama composite image including the plurality of structure images obtained through split imaging and the third structure image as the structure image included in the panorama composite image. With this, in the aspect, after the panorama composite image is generated, in a case where the camera-equipped mobile robot has moved to any position within the range of the panorama composite image, it is possible to perform the estimation of the self position.

Preferably, the self position estimation device further comprises an initial absolute position coordinate acquisition unit that acquires first absolute position coordinates as absolute position coordinates of the first position using distance information between the first position and an origin of absolute position coordinates set on the structure in an X-axis direction and distance information between the first position and the origin of the absolute position coordinates in a Y-axis direction, and a first absolute position coordinate calculation unit that calculates second absolute position coordinates as absolute position coordinates of the second position as an absolute self position based on the relative position coordinates and the first absolute position coordinates.

According to the aspect, the first absolute position coordinates as the absolute position coordinates of the first position are acquired by the initial absolute position coordinate acquisition unit from the distance information between the first position and the origin of the absolute position coordinates set on the structure in the X-axis direction and the distance information between the first position and the origin of the absolute position coordinates in the Y-axis direction. The second absolute position coordinates as the absolute self position are calculated by the first absolute position coordinate calculation unit from the relative position coordinates and the first absolute position coordinates. With this, in the aspect, it is possible to calculate the absolute self position of the camera-equipped mobile robot.

Preferably, the self position estimation device further comprises an initial absolute position coordinate acquisition unit that acquires first absolute position coordinates as absolute position coordinates of the first position using distance information between the first position and an origin of absolute position coordinates set on the structure in an X-axis direction and distance information between the first position and the origin of the absolute position coordinates in a Y-axis direction, and a second absolute position coordinate calculation unit that calculates third absolute position coordinates as absolute position coordinates of the third position as an absolute self position based on the relative position coordinates and the first absolute position coordinates.

According to the aspect, the first absolute position coordinates as the absolute position coordinates of the first position are acquired by the initial absolute position coordinate acquisition unit from the distance information between the first position and the origin of the absolute position coordinates set on the structure in the X-axis direction and the distance information between the first position and the origin of the absolute position coordinates in the Y-axis direction. The third absolute position coordinates as the absolute self position are calculated by the second absolute position coordinate calculation unit from the relative position coordinates and the first absolute position coordinates. With this, in the aspect, it is possible to calculate the absolute self position of the camera-equipped mobile robot.

Preferably, the initial absolute position coordinate acquisition unit acquires a distance between the first position and the X axis, a distance between the first position and the Y axis, and a distance between the first position and the structure with the distance measurement device in the camera-equipped mobile robot to acquire the first absolute position coordinates.

According to the aspect, the distance between the first position and the X axis, the distance between the first position and the Y axis, and the distance between the structure and the first position are acquired by the distance measurement device in the camera-equipped mobile robot. With this, in the aspect, accurate first absolute position coordinates are acquired by the distance measurement device equipped in the camera-equipped mobile robot.

Preferably the initial absolute position coordinate acquisition unit acquires a distance between the first position and the X axis and a distance between the first position and the Y axis from an image captured by the camera-equipped mobile robot, and acquires a distance between the first position and the structure with a distance measurement device in the camera-equipped mobile robot to acquire the first absolute position coordinates.

According to the aspect, the distance between the first position and the X axis, the distance between the first position and the Y axis, and the distance between the first position and the structure are acquired from the image captured by the camera-equipped mobile robot. With this, in the aspect, it is possible to acquire accurate first absolute position coordinates from the image captured by the camera-equipped mobile robot.

Preferably, the transformation coefficient is calculated from a distance between a camera of the camera-equipped mobile robot and the structure, a focal length of the camera, a size of an imaging element of the camera, and the number of pixels of an image captured by the camera.

According to the aspect, since the transformation coefficient is calculated from a distance between a camera of the camera-equipped mobile robot and the structure, a focal length of the camera, a size of an imaging element of the camera, and the number of pixels of an image captured by the camera, the transformation from the image coordinate system to the actual coordinate system is performed more accurately.

Preferably, the self position estimation device further comprises a plane calculation unit that calculates a plane of the structure using a stereo image captured by the camera-equipped mobile robot, and an image coordinate correction unit that corrects the second image coordinates based on the calculated plane.

According to the aspect, the plane of the structure is calculated by the plane calculation unit based on the stereo image captured by the camera-equipped mobile robot, and the second image coordinates are corrected by the image coordinate correction unit based on the calculated plane. With this, in the aspect, even in a case where the structure image captured without facing the structure is acquired, it is possible to perform estimation of an accurate self position.

Preferably, the self position estimation device further comprises a plane calculation unit that calculates a plane of the structure using a stereo image captured by the camera-equipped mobile robot, and an image coordinate correction unit that corrects the third image coordinates based on the calculated plane.

According to the aspect, the plane of the structure is calculated by the plane calculation unit based on the stereo image captured by the camera-equipped mobile robot, and the second image coordinates are corrected by the image coordinate correction unit based on the calculated plane. With this, in the aspect, even in a case where the structure image captured without facing the structure is acquired, it is possible to perform estimation of an accurate self position.

Preferably, the self position estimation device further comprises a composition accuracy evaluation unit that performs, using an image extracted from one image, template matching in another image in a superimposed region of the panorama composite image to evaluate composition accuracy in the superimposed region and performs determination regarding whether or not the first image coordinate acquisition unit is made to acquire the second image coordinates based on the evaluation.

According to the aspect, since the evaluation of the composition accuracy in the superimposed region of the panorama composite image is performed by the composition accuracy evaluation unit, the estimation of the self position of the camera-equipped mobile robot is performed using the panorama composite image composed with high accuracy, and estimation of an accurate self position is performed.

Preferably, the self position estimation device further comprises an image blur determination unit that performs spatial frequency analysis on the plurality of structure images acquired by the first structure image acquisition unit and performs determination regarding whether or not the first structure image acquisition unit is made to acquire the structure images again based on a result of the spatial frequency analysis.

According to the aspect, the spatial frequency analysis is performed on the structure images by the image blur determination unit, and the determination regarding whether or not the first structure image acquisition unit is made to acquire the structure images again is performed based on the result of the spatial frequency analysis. With this, in the aspect, estimation of an accurate self position is performed using the structure images, for which the result of the spatial frequency analysis is satisfactory.

Another aspect of the invention provides an image processing device comprising the self position estimation device.

A further aspect of the invention provides a self position estimation method that estimates a self position of a camera-equipped mobile robot performing inspection of a structure by subjecting the structure to split imaging. The self position estimation method comprises a first structure image acquisition step of acquiring a plurality of structure images including at least a first structure image obtained by subjecting the structure to split imaging at a first position with the camera-equipped mobile robot and a second structure image obtained by subjecting the structure to split imaging at a second position with the camera-equipped mobile robot after the camera-equipped mobile robot moves from the first position, a panorama composition step of generating a panorama composite image by subjecting the plurality of structure images including the first structure image and the second structure image to panorama composition, a first image coordinate acquisition step of acquiring second image coordinates as coordinates of a specific position of the second structure image with first image coordinates corresponding to the first position in the panorama composite image as an origin of a coordinate system of the panorama composite image, and a first relative position coordinate calculation step of calculating relative position coordinates as relative actual coordinates of the second position as a relative self position using a transformation coefficient for transforming the second image coordinates from an image coordinate system to an actual coordinate system.

Still another aspect of the invention provides a program that causes a self position estimation method of estimating a self position of a camera-equipped mobile robot performing inspection of a structure by subjecting the structure to split imaging. The program causes the computer to execute a first structure image acquisition step of acquiring a plurality of structure images including at least a first structure image obtained by subjecting the structure to split imaging at a first position with the camera-equipped mobile robot and a second structure image obtained by subjecting the structure to split imaging at a second position with the camera-equipped mobile robot after the camera-equipped mobile robot moves from the first position, a panorama composition step of generating a panorama composite image by subjecting the plurality of structure images including the first structure image and the second structure image to panorama composition, a first image coordinate acquisition step of acquiring second image coordinates as coordinates of a specific position of the second structure image with first image coordinates corresponding to the first position in the panorama composite image as an origin of a coordinate system of the panorama composite image, and a first relative position coordinate calculation step of calculating relative position coordinates as relative actual coordinates of the second position as a relative self position using a transformation coefficient for transforming the second image coordinates from an image coordinate system to an actual coordinate system.

According to the invention, in the inspection of the structure as the work purpose of the camera-equipped mobile robot, since the self position is estimated using the first structure image and the second structure image captured by the camera-equipped mobile robot, and the panorama image including the first structure image and the second structure image, it is possible to perform the self position estimation while suppressing imaging and movement other than the inspection of the structure as the work purpose of the camera-equipped mobile robot without needing a landmark and without needing imaging equipment for application other than the inspection of the structure.

BRIEF DESCRIPTION OF THE DRAWINGS

FIG. 20 is a block diagram showing a functional configuration example of the self position estimation device.

DESCRIPTION OF THE PREFERRED EMBODIMENTS

Hereinafter, a preferred embodiment of a self position estimation device, a self position estimation method, a program, and an image processing device according to the invention will be described referring to the accompanying drawings.

Figure 1:
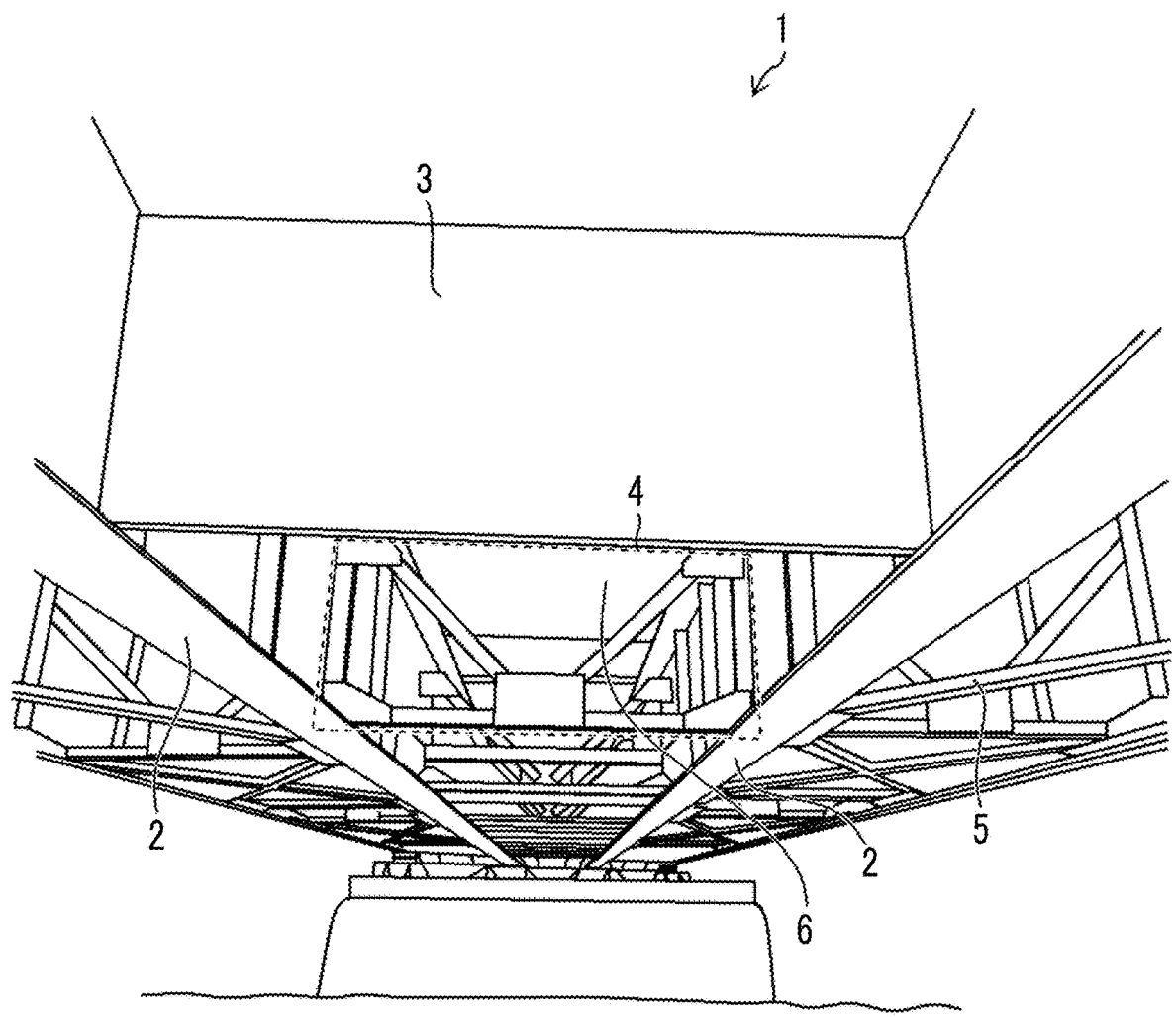
FIG. 1 is a perspective view showing a structure of a bridge as an example of a structure.

FIG. 1 is a perspective view showing a structure of a bridge 1 as an example of a structure as an inspection target, and is a perspective view when the bridge 1 is viewed from below. A structure to which the invention is applied is not limited to the bridge. For example, the invention is applied to a tunnel, a box culvert, a dam, a road, a waterway, a breakwater, a building, a tank, a ship, an embankment, a revetment, a slope, a sewer, a common duct, a parking lot, a warehouse, and a water tank. Even in the bridge 1, the invention is applied to structure images of various parts, such as a deck slab, a beam, a bridge pier, and an abutment.

The bridge 1 shown in FIG. 1 has main girders 2, cross beams 3, cross frames 4, and lateral frames 5, and the main girders 2, the cross beams 3, the cross frames 4, and the lateral frames 5 are connected by bolts, rivets or welding. Deck slabs 6 on which vehicles and the like travel are placed on the main girders 2 and the like. The deck slabs 6 are generally made of reinforced concrete.

The main girder 2 is a member that is laid between the abutments or the bridge piers and supports the load of the vehicles and the like on the deck slab 6. The cross beam 3 is a member that connects the main girders 2 to support the load by a plurality of main girders 2. The cross frame 4 and the lateral frame 5 are members that connect the main girders 2 to resist a lateral load of wind and earthquake, respectively. A panel is a space that is formed by dividing the deck slab 6 by two facing main girders 2 and two facing cross beams 3 or cross frames 4, and in a case where inspection of the bridge 1 is performed, inspection may be performed in units of panels.

Figure 2:
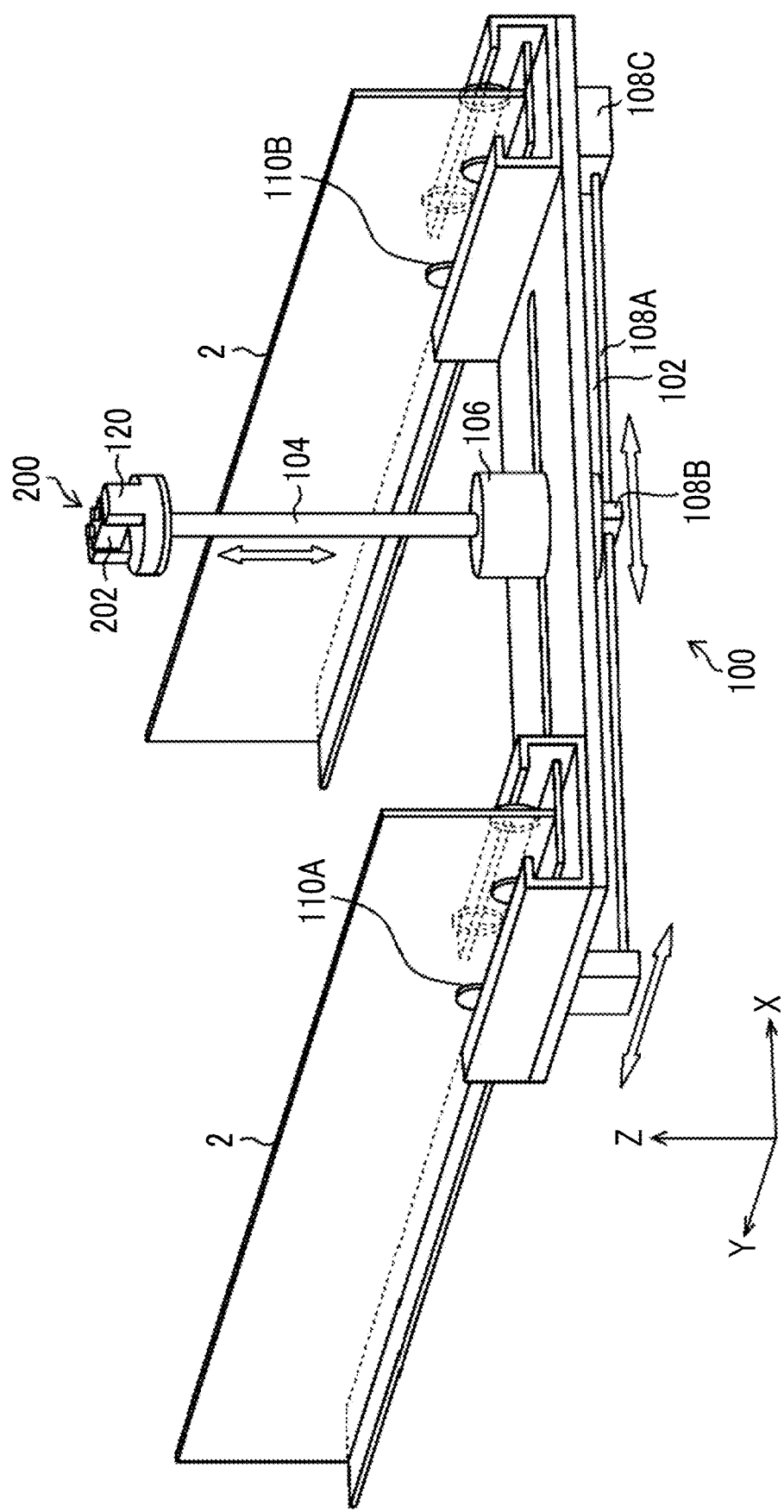
FIG. 2 is a perspective view showing an appearance of a robot device.
Figure 3:
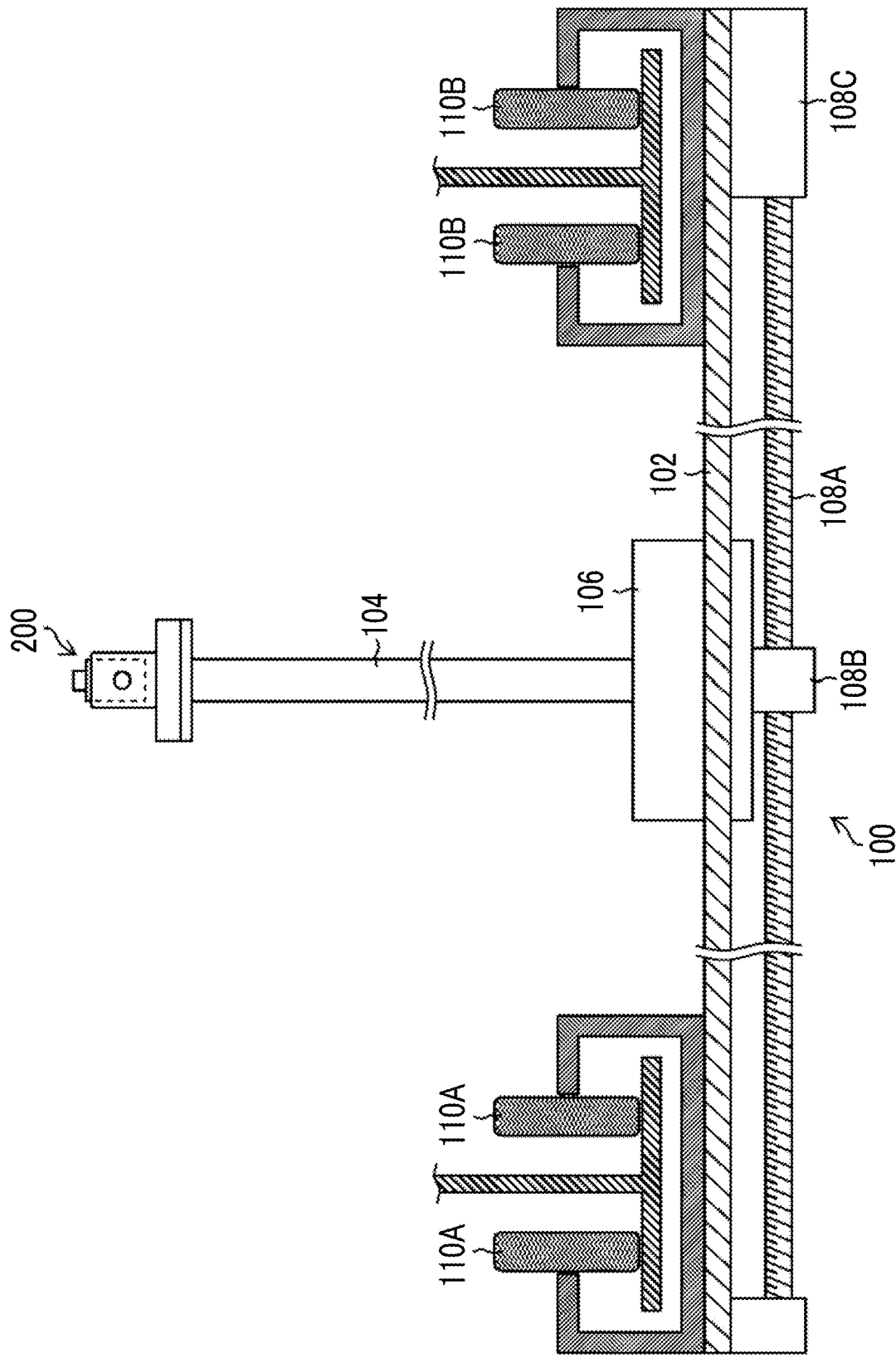
FIG. 3 is a cross-sectional view of a main part of the robot device.

FIG. 2 is a perspective view showing an appearance of a robot device 100 including a twin-lens camera 202 according to an embodiment of an imaging device 200, and shows a state in which the robot device 100 is provided between the main girders 2 of the bridge 1. FIG. 3 is a cross-sectional view showing a main part of the robot device 100 shown in FIG. 2. The robot device 100 is a camera-equipped mobile robot and is a robot for an inspection work of the bridge 1.

As shown in FIGS. 2 and 3, the robot device 100 comprises the imaging device 200, and controls a position (imaging position) of the imaging device 200 within a three-dimensional space and controls an imaging direction of the imaging device 200 to image any member to be inspected or the like of the bridge 1 having a plurality of members at the time of inspection of the bridge 1.

Though details will be described below, the robot device 100 comprises a main frame 102, a vertical telescopic aria 104, a housing 106 where a drive unit, various control units, and the like of the vertical telescopic arm 104 are provided, an X-direction drive unit 108 (FIG. 5) that moves the housing 106 in a longitudinal direction of the main frame 102 (a direction perpendicular to a longitudinal direction of the main girder 2) (X direction), a Y-direction drive unit 110 (FIG. 5) that moves the entire robot device 100 in the longitudinal direction of the main girder 2 (Y direction), and a Z-direction drive unit 112 (FIG. 5) that makes the vertical telescopic arm 104 expand and contract in a vertical direction (Z direction).

The X-direction drive unit 108 has a ball screw 108A that is provided in the longitudinal direction of the main frame 102 (X direction), a ball nut 108B that is provided in the housing 106, and a motor 108C that rotates the ball screw 108A, and rotates the ball screw 108A in a normal direction or a reverse direction by the motor 108C to move the housing 106 in the X direction.

The Y-direction drive unit 110 has tires 110A and 110B that are provided at both ends of the main frame 102, and motors (not shown) that are provided in the tires 110A and 110B, and drives the tires 110A and 110B by the motors to move the entire robot device 100 in the Y direction.

The robot device 100 is provided in an aspect in which the tires 110A and 110E at both ends of the main frame 102 are disposed on lower flanges of the two main girders 2 and are disposed such that the main girders 2 are sandwiched between the tires 110A and 110B. With this, the robot device 100 can move (be self-propelled) along the main girders 2 while being suspended from the lower flanges of the main girders 2. Though not shown, the main frame 102 is configured such that the length of the main frame 102 can be adjusted according to an interval between the main girders 2.

The vertical telescopic arm 104 is provided in the housing 106 of the robot device 100 and moves in the X direction and the Y direction along with the housing 106. The vertical telescopic arm 104 expands and contracts in the Z direction by the Z-direction drive unit 112 (FIG. 5) provided in the housing 106.

Figure 4:
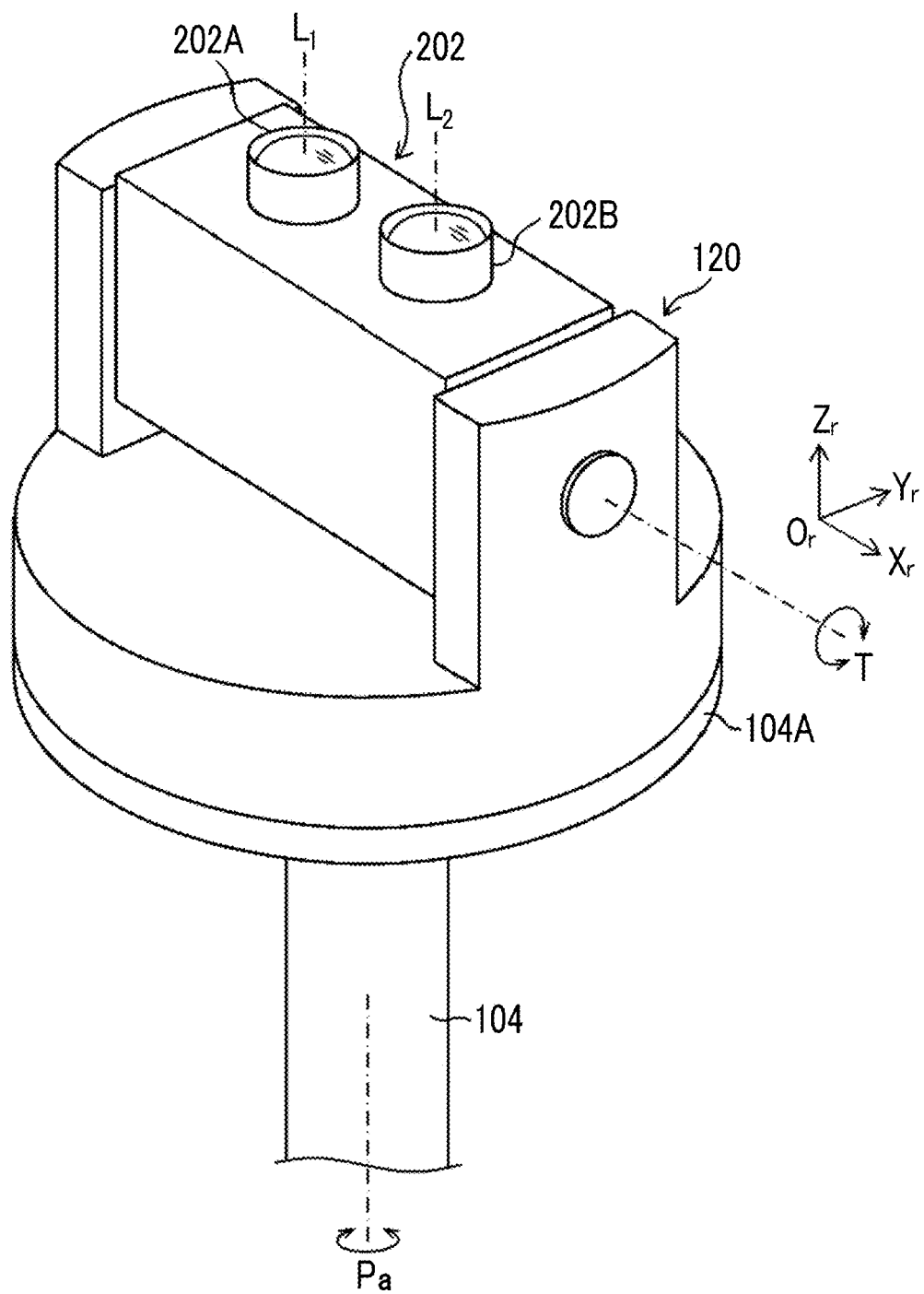
FIG. 4 is an appearance perspective view of a twin-lens camera and a pan/tilt mechanism.

FIG. 4 is an appearance perspective view of the twin-lens camera and a pan/tilt mechanism 120. As shown in FIG. 4, a camera mounting portion 104A is provided at a distal end of the vertical telescopic arm 104, and the twin-lens camera 202 that can be rotated in a pan direction and a tilt direction by the pan/tilt mechanism 120 is provided in the camera mounting portion 104A.

The twin-lens camera 202 has a first imaging unit 202A and a second imaging unit 202B that capture two parallax images (stereoscopic image) with different parallax, acquires space information of a structure (bridge 1) corresponding to an imaging range of the twin-lens camera 202 that is space information of the bridge 1 in a local coordinate system (camera coordinate system) based on the twin-lens camera 202, and acquires at least one image of two images to be captured as an "inspection image" to be attached to an inspection report.

Figure 5:
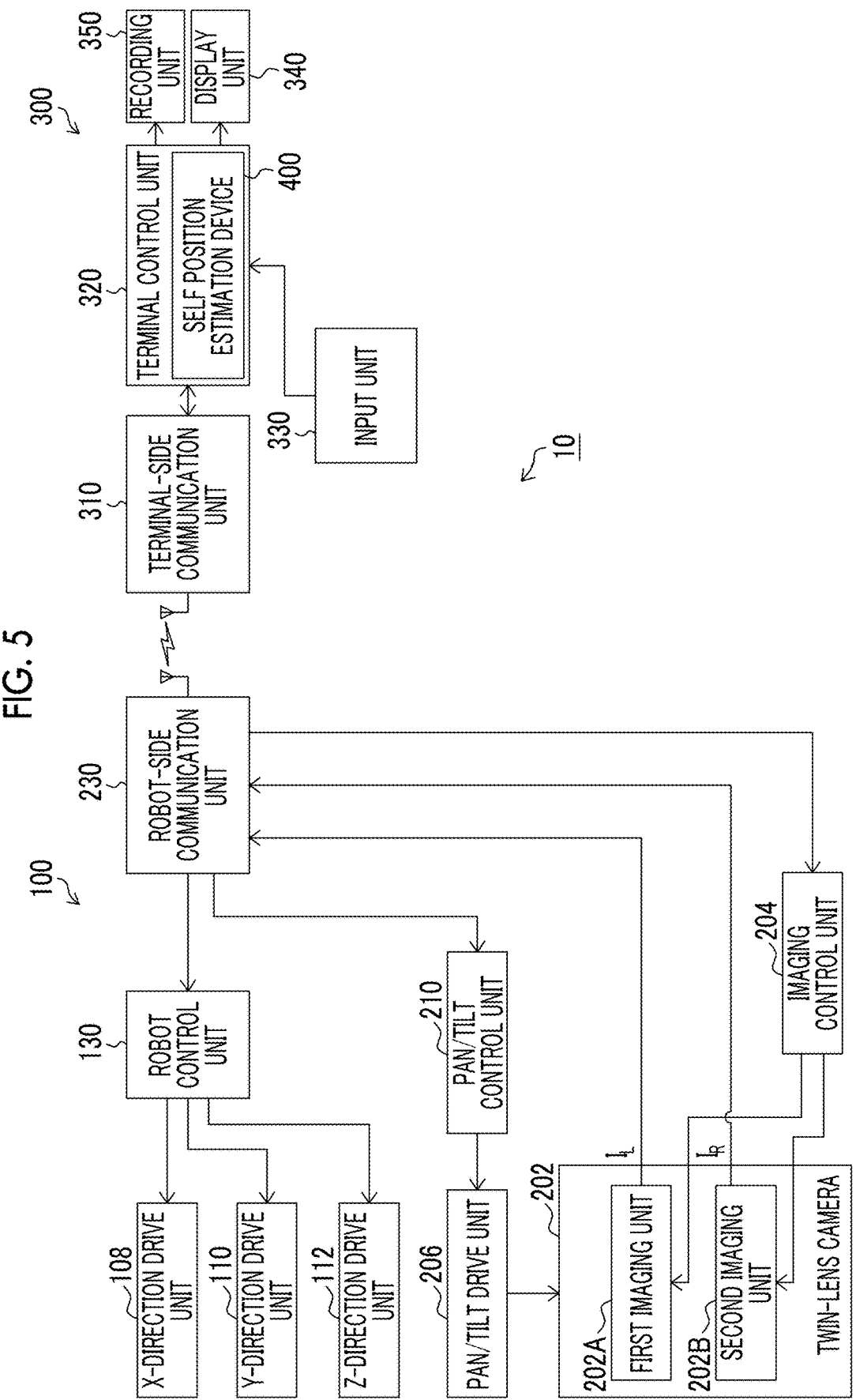
FIG. 5 is a block diagram showing a functional configuration example of an inspection system.

The twin-lens camera 202 is rotated around a pan axis Pa coaxial with the vertical telescopic arm 104 or is rotated around a tilt axis T in a horizontal direction by the pan/tilt mechanism 120 to which a driving force is applied from a pan/tilt drive unit 206 (FIG. 5). With this, the twin-lens camera 202 can capture images in any posture (capture images in any imaging direction).

An optical axis $L_1$ of the first imaging unit 202A and an optical axis $L_2$ of the second imaging unit 202B of the twin-lens camera 202 of the example are parallel to each other. The pan axis Pa is perpendicular to the tilt axis T. A base line of the twin-lens camera 202 (that is, an interval at which the first imaging unit 202A and the second imaging unit 202B are provided) is known.

The camera coordinate system based on the twin-lens camera 202 has, for example, a cross point of the pan axis Pa and the tilt axis T as an origin Or, a direction of the tilt axis T as an x-axis direction, a direction of the pan axis Pa as a z-axis direction, and a direction perpendicular to the x axis and the y axis as a y-axis direction.

A position of the twin-lens camera 202 (a position of the origin Or of the camera coordinate system) that is a position (hereinafter, referred to as an "imaging position") in a global coordinate system (bridge coordinate system) is detected by a global positioning system (GPS) (hereinafter, referred to as a "GPS device"), and can be detected using moving distances of the robot device 100 in the X direction and the Y direction with respect to the origin of the bridge coordinate system and a moving distance of the vertical telescopic arm 104 in the Z direction. The imaging direction of the twin-lens camera 202 is detected by a pan angle α and a tilt angle β of the pan/tat mechanism 120, and can be detected by an azimuth sensor (not shown) mounted in the twin-lens camera 202.

FIG. 5 is a block diagram showing a functional configuration example of an inspection system 10.

As shown in FIG. 5, the inspection system 10 has a robot control unit 130, the X-direction drive unit 108, the Y-direction drive unit 110, and the Z-direction drive unit 112 on the robot device 100 side, the twin-lens camera 202, an imaging control unit 204, a pan/tilt control unit 210, and the pan/tilt drive unit 206 on the imaging device 200 side, a robot-side communication unit 230, and a terminal device 300.

The robot-side communication unit 230 performs bidirectional wireless communication with a terminal-side communication unit 310, receives various commands, such as a movement command for controlling the movement of the robot device 100, a pan/tilt command for controlling the pan/tilt mechanism 120, and an imaging command for controlling the twin-lens camera 202, transmitted from the terminal-side communication unit 310, and outputs the received commands to the corresponding control units.

The robot control unit 130 controls the X-direction drive unit 108, the Y-direction drive unit 110, and the Z-direction drive unit 112 based on the movement command input from the robot-side communication unit 230, moves the robot device 100 in the X direction and the Y direction, and makes the vertical telescopic arm 104 expand and contract in the Z direction (see FIG. 2).

The pan/tilt control unit 210 operates the pan/tilt mechanism 120 in the pan direction and the tilt direction through the pan/tilt drive unit 206 based on the pan/tilt command input from the robot-side communication unit 230 and makes the twin-lens camera 202 pan and tilt in a desired direction (see FIG. 4).

The imaging control unit 204 makes the first imaging unit 202A and the second imaging unit 202B of the twin-lens camera 202 capture a live view image or an inspection image based on the imaging command input from the robot-side communication unit 230.

Image data indicating a first image $I_L$ and a second image $I_R$ with different parallax captured by the first imaging unit 202A and the second imaging unit 202B of the twin-lens camera 202 at the time of inspection of the bridge 1 and information indicating an imaging position (the position of the origin Or of the camera coordinate system in the bridge coordinate system) and the imaging direction (in the example, a pan angle α and a tilt angle β of the twin-lens camera 202 are transmitted to the terminal-side communication unit 310 through the robot-side communication unit 230.

The terminal device 300 is operated by an inspector who operates the inspection system 10, and primarily has the terminal-side communication unit 310, a terminal control unit 320, an input unit 330 that functions as an operating unit, a display unit 340, and a recording unit 350. For example, a computer or a tablet terminal can be applied to the terminal device 300. The terminal device 300 has various functions that are normally provided in the computer or the tablet terminal, and also functions as, for example, an image processing device.

The terminal-side communication unit 310 performs bidirectional wireless communication with the robot-side communication unit 230, receives various kinds of information that are input from the robot-side communication unit 230 (image data indicating the live view image captured by the first imaging unit 202A and the second imaging unit 202B, the first image $I_L$, and the second image $I_R$, and information indicating the imaging position and the imaging direction of the twin-lens camera 202), and transmits various commands according to operations on the input unit 330 input through the terminal control unit 320 to the robot-side communication unit 230.

The terminal control unit 320 outputs image data indicating the live view image received through the terminal-side communication unit 310 to the display unit 340, and makes the display unit 340 display the live view image on the screen of the display unit 340. The input unit 330 has a robot operation input unit, a pan/tilt operation input unit, and an imaging operation input unit, the robot operation input unit outputs the movement command for moving the robot device 100 (twin-lens camera 202) in the X direction, the Y direction, and the Z direction, the pan/tilt operation input unit outputs the pan/tilt command for rotating the pan/tilt mechanism 120 (twin-lens camera 202) in the pan direction and the tilt direction, and the imaging operation input unit outputs the imaging command for instructing the twin-lens camera 202 to capture the inspection image. The inspector manually operates the input unit 330 while viewing the live view image displayed on the display unit 340, and the input unit 330 outputs various commands, such as the movement command of the twin-lens camera 202 in the X direction, the Y direction, and the Z direction, the pan/tilt command, and the imaging command, to the terminal control unit 320 according to the operations of the inspector. The terminal control unit 320 transmits various commands input from the input unit 330 to the robot-side communication unit 230 through the terminal-side communication unit 310.

The terminal control unit 320 has a self position estimation device 400. The self position estimation device 400 will be described below in detail.

First Embodiment

Next, a self position estimation device 400 according to a first embodiment of the invention will be described.

Figure 6:
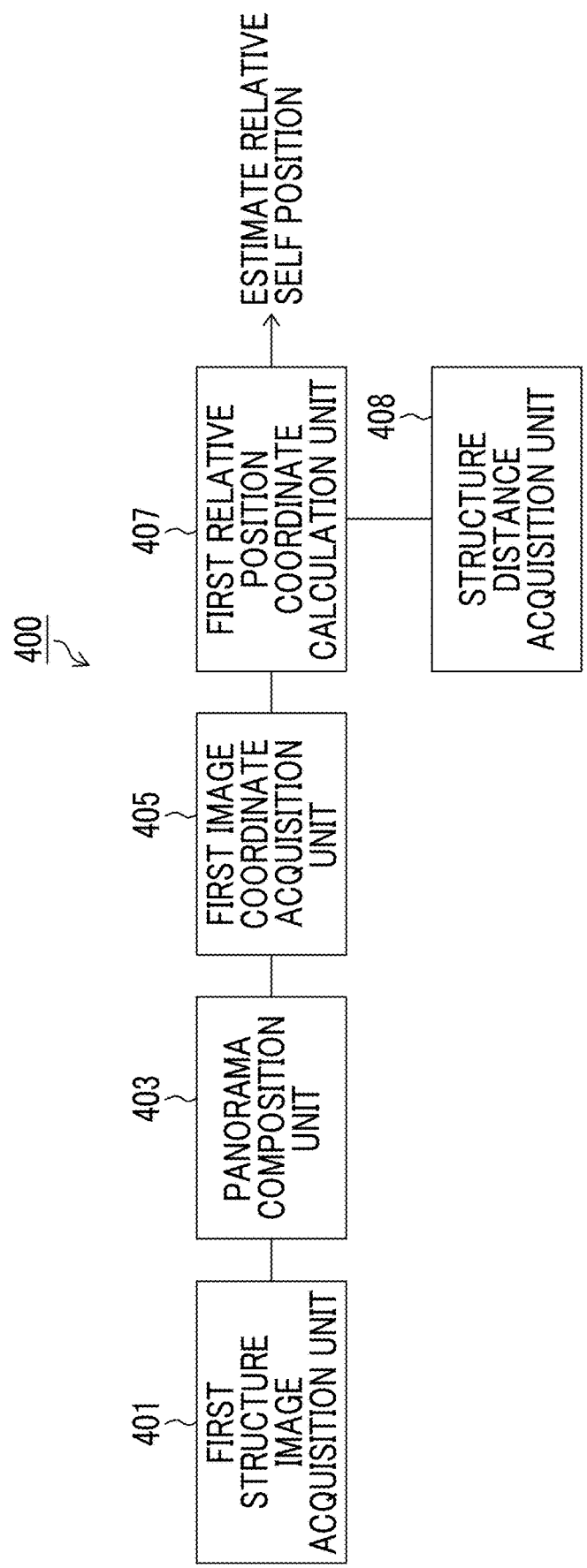
FIG. 6 is a block diagram showing a functional configuration example of a self position estimation device.

FIG. 6 is a block diagram showing a functional configuration example of the self position estimation device 400 of the embodiment. The self position estimation device 400 primarily has a first structure image acquisition unit 401, a panorama composition unit 403, a first image coordinate acquisition unit 405, a first relative position coordinate calculation unit 407, and a structure distance acquisition unit 408. In the following description, an example where a deck slab image as an example of a structure image is acquired will be described. Thus, a first structure image is a first deck slab image, a second structure image is a second deck slab image, and a third structure image is a third deck slab image.

The first structure image acquisition unit 401 acquires deck slab images obtained by subjecting the deck slab 6 of the bridge 1 as an inspection target to split imaging by the twin-lens camera 202. Specifically, the first structure image acquisition unit 401 acquires a plurality of deck slab images including at least a first deck slab image obtained by subjecting the deck slab 6 to split imaging at a reference position (first position) by the camera-equipped mobile robot and a second deck slab image obtained by subjecting the deck slab 6 to split imaging at a self position estimation position (second position) after the camera-equipped mobile robot moves from the reference position. The reference position is a position to be a reference in a case where self position estimation is performed, and is, for example, an initial position of the movement of the robot device 100. The self position estimation position is a position where estimation of a self position of the robot device 100 is performed. In the invention, the estimation of the self position of the robot device 100 is performed by calculating the coordinates of the self position estimation position.

The panorama composition unit 403 generates a panorama composite image by subjecting a plurality of deck slab images including the first deck slab image and the second deck slab image to panorama composition. The panorama composition unit 403 can subject the deck slab images acquired by the first structure image acquisition unit 401 to panorama composition by a known technique. The panorama composition unit 403 acquires information relating to an order, a position, and the like of each deck slab image needed at the time of panorama composition from the robot device 100.

The first image coordinate acquisition unit 405 acquires second image coordinates as coordinates of a specific position of the second deck slab image corresponding to the self position estimation position with first image coordinates corresponding to a reference position in the panorama composite image generated by the panorama composition unit 403 as an origin of a coordinate system of the panorama composite image. The first image coordinates corresponding to the reference position are coordinates on an image related to the reference position of the robot device 100, and are, for example, coordinates of a center point of the first deck slab image (an optical axis of the twin-lens camera 202 on the image) or any one of four vertexes of a rectangle of the first deck slab image. The coordinates of the specific position of the second deck slab image are coordinates on an image related to the self position estimation position of the robot device 100, and are, for example, coordinates of a center point of the second deck slab image or any one of four vertexes of a rectangle of the second deck slab image.

The first relative position coordinate calculation unit 407 calculates relative position coordinates as relative actual coordinates of the second position as a relative self position using a transformation coefficient for transforming the second image coordinates from an image coordinate system to an actual coordinate system. The image coordinate system expresses coordinates in a panorama image, and the actual coordinate system (bridge coordinate system) expresses coordinates indicating an actual position where the robot device 100 is positioned.

The structure distance acquisition unit 408 acquires the distance between the imaging device 200 and the deck slab 6. That is, the structure distance acquisition unit 408 acquires an imaging distance of the deck slab 6 from the imaging device 200, for example, using a stereo image acquired by the imaging device 200. A point for the measurement of the distance is manually decided or automatically decided through image recognition on the stereo image (left image or right image). In a case where the same plane is imaged in a captured image, designation of the point for the measurement of the distance is not needed. Acquisition means of the distance of the structure distance acquisition unit 408 is not limited to acquisition means using the stereo image. For example, the structure distance acquisition unit 408 may acquire the distance by user input or may acquire the distance with a distance sensor in the robot device 100.

Figure 7:
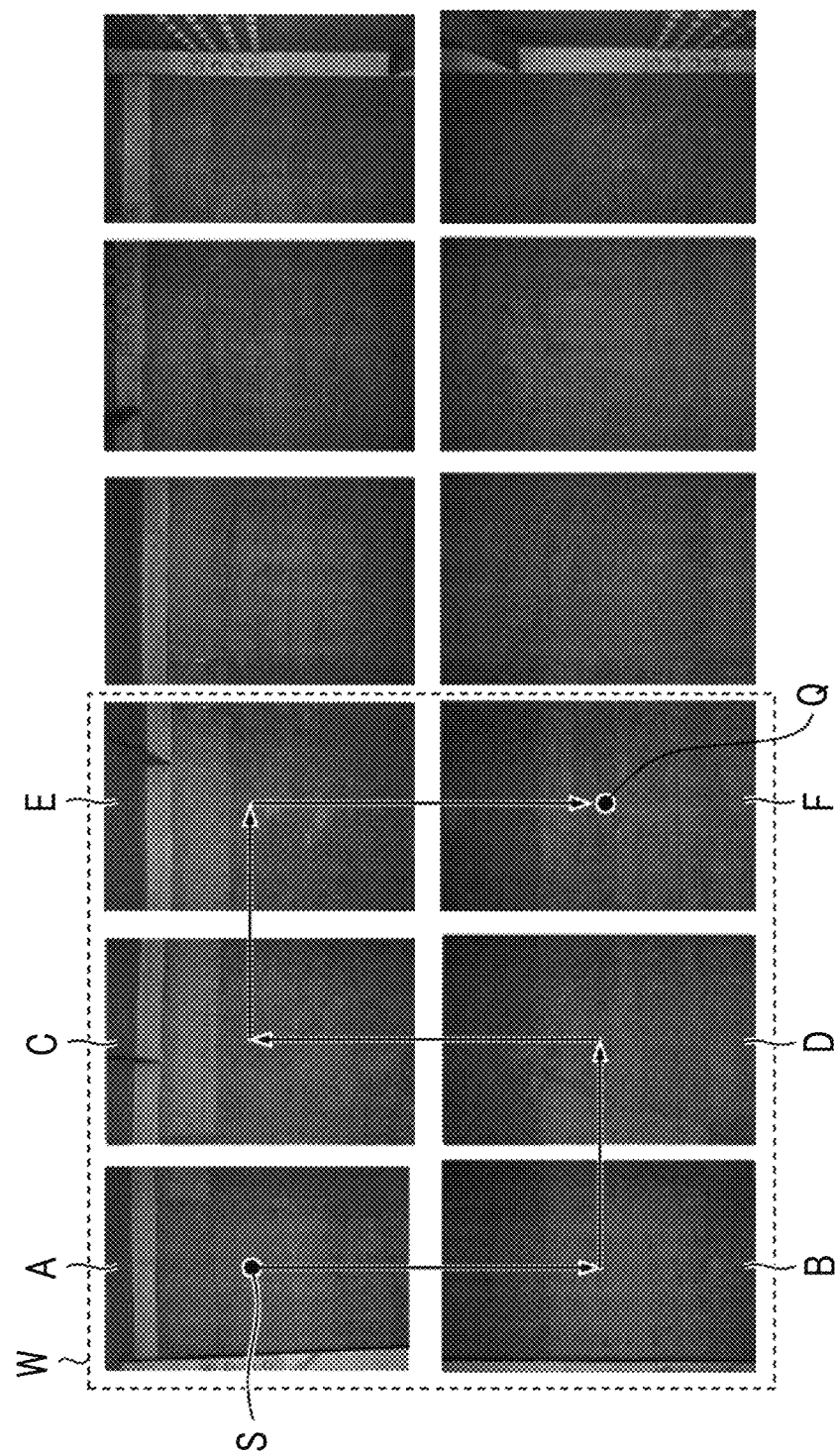
FIG. 7 is a diagram conceptually showing a deck slab image obtained through split imaging.
Figure 8:
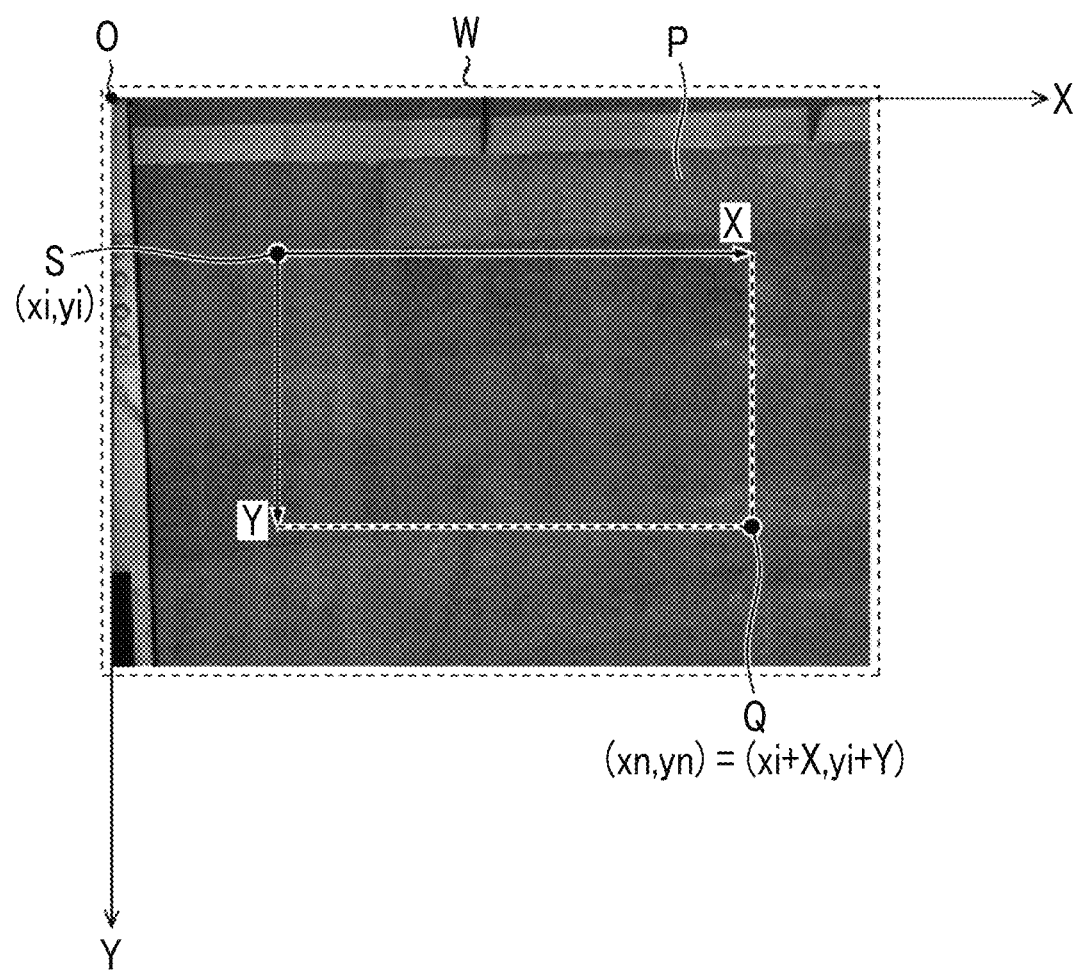
FIG. 8 is a diagram showing a panorama composite image.

Next, the acquisition of the image coordinates performed by the first image coordinate acquisition unit 405 will be described referring to FIGS. 7 and 8, FIG. 7 is a diagram conceptually showing deck slab images by subjecting the deck slab 6 to split imaging while the robot device 100 repeats movement, stop, and imaging. In a case shown in FIG. 7, the robot device 100 moves from an initial position S to a self position estimation position Q along a route shown in the drawing, and deck slab images A to F are captured by the robot device 100. Although the robot device 100 has the first imaging unit 202A and the second imaging unit 202B as described above, the deck slab images are captured by any one imaging unit or the two imaging units. The robot device 100 may acquire the deck slab images such that a composition overlap width can be secured to generate a panorama composite image using a plurality of deck slab images. For example, in a case where a panorama composite image is generated, the composition overlap width of the deck slab images is 30% of the deck slab image on one side.

The deck slab image A captured at the initial position S is the first deck slab image, and the deck slab image F captured at the self position estimation position Q is the second deck slab image. The panorama composition unit 403 subjects the deck slab images A to F surrounded by a frame W to panorama composition to acquire a panorama composite image.

FIG. 8 is a diagram showing a panorama composite image composed by the panorama composition unit 403. A panorama composite image P is generated by the panorama composition unit 403 based on the deck slab images A to F shown in FIG. 7. In a case where the origin O is one (an upper left vertex in the drawing) among four vertexes of the deck slab image A, the coordinates of the initial position S can be represented as (xi,yi). The coordinates (xn,yn) of the self position estimation position Q are represented as (x+X, yi+Y) since the moving distance from the initial position S to the self position estimation position Q is X and Y. In a case shown in FIG. 8, the first image coordinates is one vertex of the deck slab image A (the upper left vertex in the drawing) as the origin O.

The first image coordinate acquisition unit 405 can obtain the moving distance using the distance between the initial position S and the self position estimation position Q in the panorama composite image P. For example, the first image coordinate acquisition unit 405 can obtain the coordinates of the self position estimation position Q by counting the number of pixels in the panorama composite image P.

Next, the acquisition of the relative position coordinates will be described.

The relative position coordinates are calculated by the first relative position coordinate calculation unit 407. The first relative position coordinate calculation unit 407 uses the transformation coefficient to the image coordinates of the self position estimation position Q acquired by the first image coordinate acquisition unit 405, thereby transforming the image coordinates of the self position estimation position Q from the image coordinate system to the actual coordinate system to acquire the relative position coordinates of the self position estimation position (current position) Q.

Figure 9:
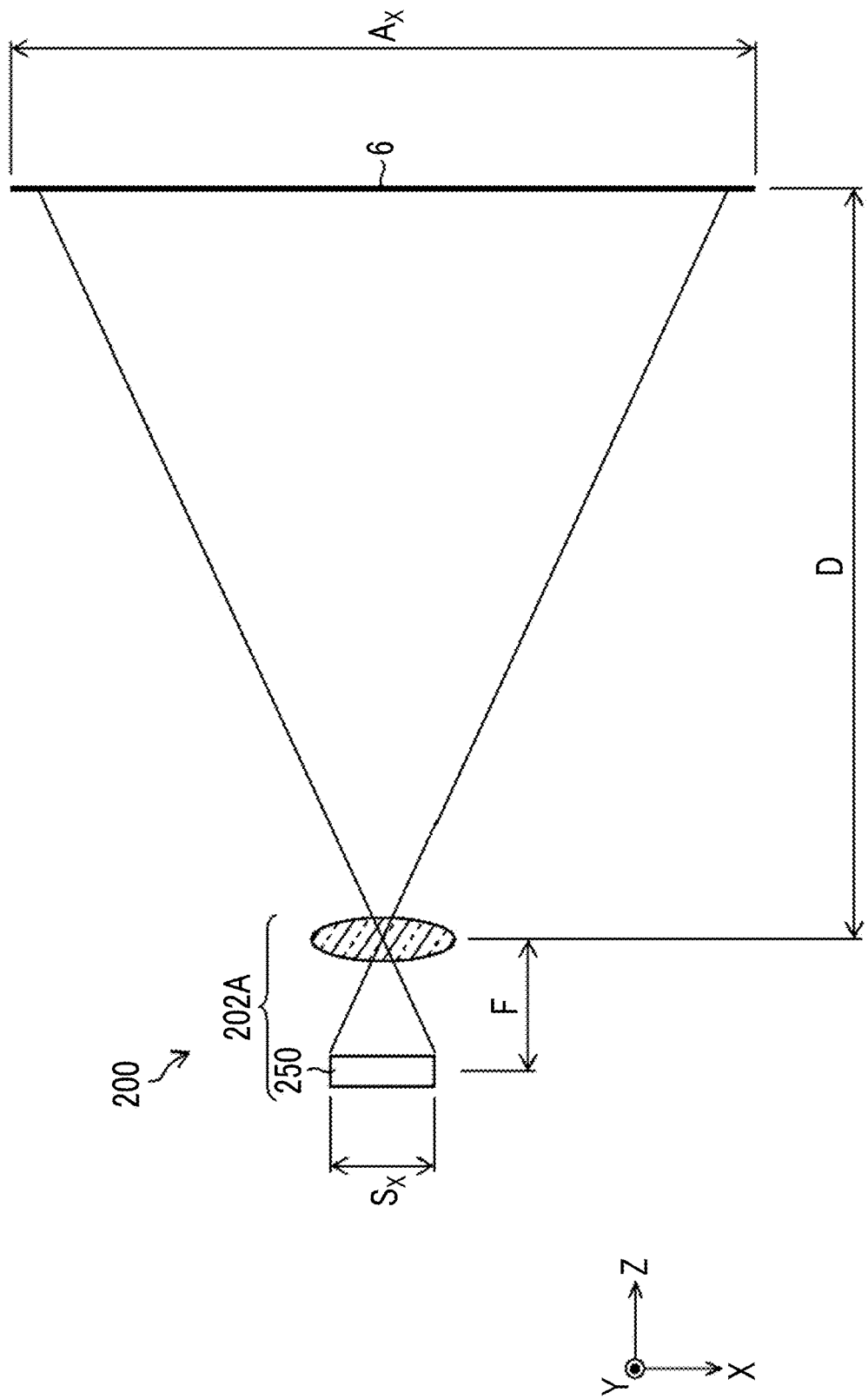
FIG. 9 is a diagram illustrating calculation of a transformation coefficient.

The transformation coefficient can be calculated as described below. FIG. 9 is a diagram illustrating the calculation of the transformation coefficient.

The transformation coefficient is calculated from the distance between the imaging device 200 of the robot device 100 and the deck slab 6, a focal length of the imaging device 200, the size of an imaging element 250 of the imaging device 200, and the number of pixels of an image to be captured by the imaging device 200.

The distance between the imaging device 200 and the deck slab 6 is referred to as D, the focal length of the lens of the first imaging unit 202A is referred to as F, the size of the imaging element 250 of the imaging device 200 is referred to as Sx×Sy, and the number of pixels of the captured image (deck slab image) is referred to as Px×Py. In this case, the imaging range of the deck slab 6 corresponding to the deck slab image can be calculated as follows. The distance D between the imaging device 200 and the deck slab 6 is acquired by the structure distance acquisition unit 408.

Imaging range ($Ax$) of deck slab on $X$ axis=$D \times Sx/F$

Imaging range ($Ay$) of deck slab on $Y$ axis=$D \times Sy/F$

Then, the transformation coefficient (Tx,Ty) from the image coordinate system to the actual coordinate system is calculated as follows.

$Tx=Ax/Px$ $Ty=Ay/Py$

Description will be provided below using a specific example.

It is assumed that the distance between the imaging device 200 and the deck slab 6: D=2100 mm, the focal length: F=27 mm, the imaging element 250 (image sensor (Advanced Photo System (APS)-C)): Sx=23.6 mm, Sy=15.6 mm, the number of pixels of the captured image: Px=4836 pixels, and Py=3264 pixels.

The imaging range of the deck slab image is as follows under the above-described conditions.

Imaging range ($Ax$) of deck slab on $X$ axis=1835.6 mm

Imaging range ($Ay$) of deck slab on $Y$ axis=1213.3 mm

Then, in this case, the transformation coefficient (Tx,Ty) is obtained as follows.

$Tx=0.375$, $Ty=0.372$

Next, the relative position coordinates that are calculated by the first relative position coordinate calculation unit 407 using the transformation coefficient calculated as described above will be described.

For example, in a case where the image coordinates (Xp,Yp) of the self position estimation position Q and a moving distance (Lpx,Lpy) are acquired by the first image coordinate acquisition unit 405, relative position coordinates (Xr,Xr) and an actual moving distance (Lrx,Lry) in the actual coordinate system are calculated as follows.

$Xr=Xp \times Tx$, $Yr=Yp \times Ty$ $Lrx=Lpx \times Tx$, $Lry=Lpy \times Ty$

The relative position coordinates (Xr,Xr) indicate a position in the actual coordinate system corresponding to the self position estimation position Q, and the actual moving distance indicates a moving distance in the actual coordinate system from the initial position S to the self position estimation position Q.

The self position estimation device 400 estimates the relative position coordinates calculated by the first relative position coordinate calculation unit 407 as a relative self position.

Figure 10:
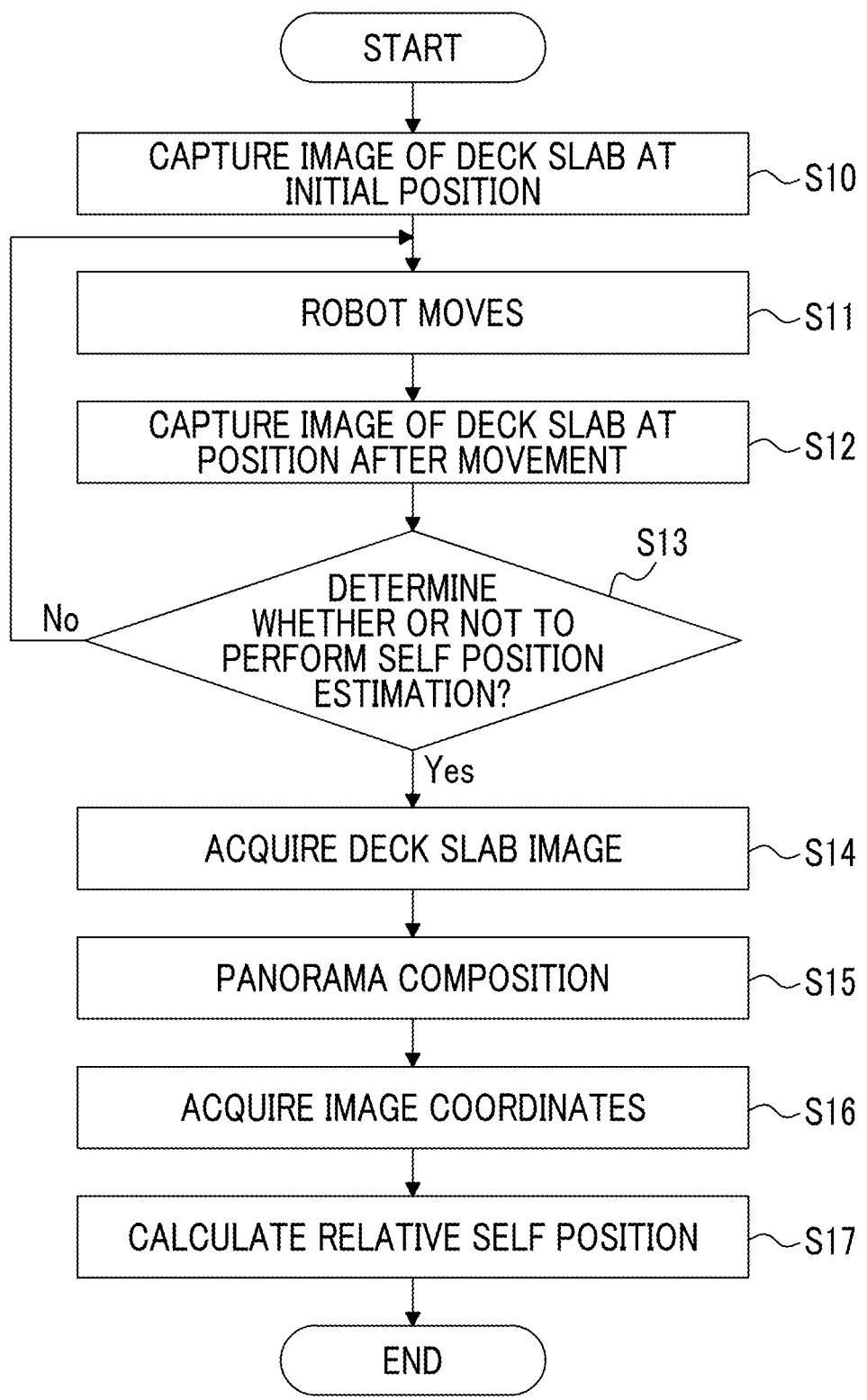
FIG. 10 is a diagram showing an operation flow of the self position estimation device.

FIG. 10 is a diagram showing an operation flow of the self position estimation device 400.

First, the deck slab image is captured by the imaging device 200 of the robot device 100 (Step S10). Thereafter, the robot device 100 moves to a next imaging position (Step S11). Then, after the robot device 100 has moved, the deck slab 6 is imaged at the moved position (imaging position) (Step S12). Thereafter, the robot control unit 130 of the robot device 100 determines whether or not to perform the self position estimation (Step S13). In a case where the robot control unit 130 determines not to perform the self position estimation at a position of a moving destination, the robot device 100 moves to a next moving location along an imaging plan. The robot device 100 performs movement and imaging of the deck slab images along an imaging plan having a moving route and imaging positions determined in advance. The estimation of the self position of the self position estimation device 400 is performed, for example, to confirm whether or not the robot device 100 is moving along the imaging plan.

In a case where the robot control unit 130 of the robot device 100 determines to perform the self position estimation, the self position estimation device 400 operates.

First, the deck slab images captured by the imaging device 200 are acquired by the first structure image acquisition unit 401 of the self position estimation device 400 (first structure image acquisition step: Step S14). Thereafter, the panorama composition unit 403 composes a panorama composite image from a plurality of deck slab images acquired by the first structure image acquisition unit 401 (panorama composition step: Step S15). Thereafter, the first image coordinate acquisition unit 405 acquires the image coordinates of the self position estimation position Q (current position) where the self position estimation is performed (first image coordinate acquisition step: Step S16). Then, the first relative position coordinate calculation unit 407 calculates the relative position coordinates as a relative self position (first relative position coordinate calculation step: Step S17).

Thereafter, the self position estimation device 400 estimates the relative position coordinates as a relative self position.

The above-described configurations and functions can be appropriately implemented by any hardware, software, or combinations of hardware and software. For example, the invention can be applied to a program that causes a computer to execute the above-described processing steps (processing procedure), a computer-readable recording medium (non-transitory recording medium) having the program recorded thereon, or a computer on which the program can be installed.

Second Embodiment

Next, a second embodiment of the invention will be described.

Figure 11:
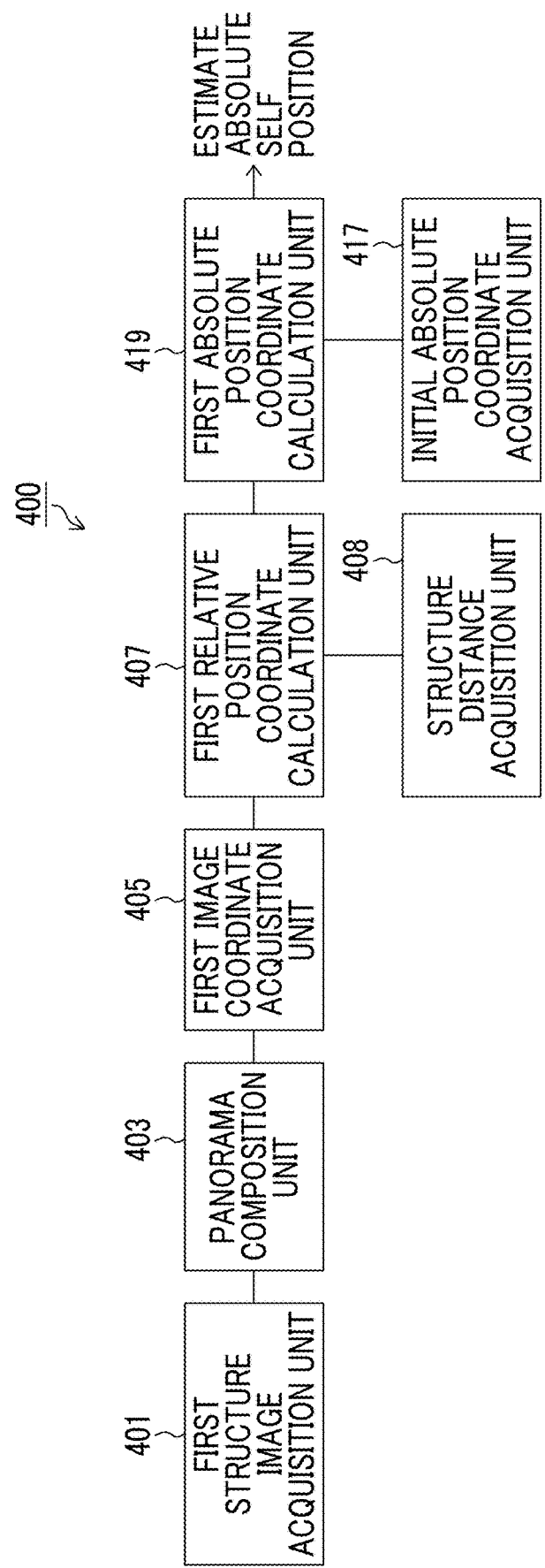
FIG. 11 is a block diagram showing a functional configuration example of the self position estimation device.

FIG. 11 is a block diagram showing a functional configuration example of a self position estimation device 400 of the embodiment. The self position estimation device 400 primarily has a first structure image acquisition unit 401, a panorama composition unit 403, a first image coordinate acquisition unit 405, a first relative position coordinate calculation unit 407, a structure distance acquisition unit 408, a first absolute position coordinate calculation unit 419, and an initial absolute position coordinate acquisition unit 417. The parts already described in FIG. 6 are represented by the same reference numerals, and description thereof will not be repeated.

The initial absolute position coordinate acquisition unit 417 acquires absolute position coordinates of the initial position S. The absolute position coordinates of the initial position S are a coordinate system in a panel surrounded by the main girders 2 and the cross beams 3 or a panel surrounded by the main girders 2 and the cross frames 4. The initial absolute position coordinate acquisition unit 417 acquires first absolute position coordinates as absolute position coordinates of the first position using distance information between the first position and the main girder 2 of the bridge 1 and distance information between the first position and the cross beam 3 or the cross frame 4 of the bridge 1. In this case, the first position is the initial position S.

The first absolute position coordinate calculation unit 419 calculates second absolute position coordinates as absolute position coordinates of the self position estimation position Q as an absolute self position based on the relative position coordinates and the first absolute position coordinates. The first absolute position coordinate calculation unit 419 calculates the second absolute position coordinates, for example, by adding the first absolute position coordinates to the relative position coordinates calculated by the first relative position coordinate calculation unit 407. The second absolute position coordinates belong to, for example, a coordinate system in a case where the main girder in the panel is defined as the X axis and the cross beam (cross frame) is defined as the Y axis with the origin O as a part where the main girder 2 and the cross beam 3 cross each other in the panel or a part where the main girder 2 and the cross frame 4 cross each other.

Figure 12:
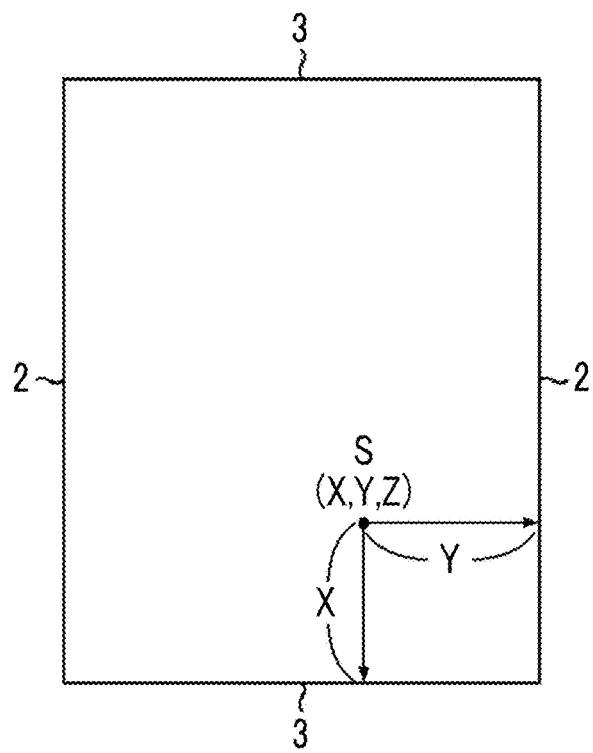
FIG. 12 is a diagram showing an example of acquisition of first absolute position coordinates.

Next, acquisition of initial absolute position coordinates of the initial absolute position coordinate acquisition unit 417 will be described. FIG. 12 is a diagram showing an example of the acquisition of the first absolute position coordinates of the initial absolute position coordinate acquisition unit 417.

In a case shown in FIG. 12, the twin-lens camera 202 of the robot device 100 is used as a distance measurement device, and the distance between the initial position S and the main girder 2, the distance between the initial position S and the cross beam 3 or the cross frame 4, and the distance between the initial position S and the deck slab 6 are acquired. That is, the robot device 100 drives the twin-lens camera 202 in the pin direction and/or the tilt direction at the initial position S to acquire the distance between the initial position S and the main girder 2, the distance between the initial position S and the cross beam 3 or the cross frame 4, and the distance between the initial position S and the deck slab 6 and acquires the first absolute position coordinates. Although the robot device 100 shown in FIG. 4 uses the twin-lens camera 202 as the distance sensor, the invention is not limited thereto, and the robot device 100 may comprise a laser distance sensor or the like. The distance between the twin-lens camera 202 and the deck slab 6 is a distance that is acquired by the structure distance acquisition unit 408.

Figure 13:
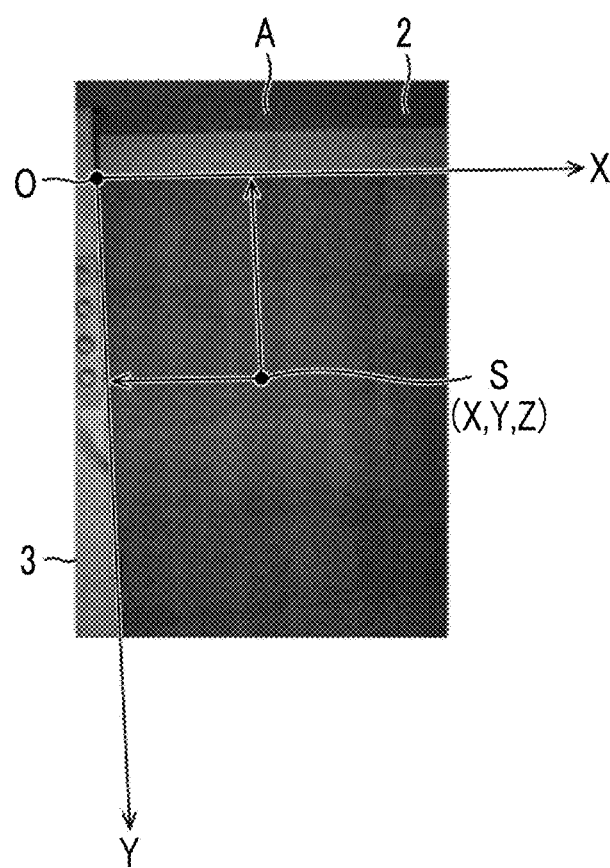
FIG. 13 is a diagram showing an example of acquisition of the first absolute position coordinates.

FIG. 13 is a diagram showing an example of the acquisition of the first absolute position coordinates of the initial absolute position coordinate acquisition unit 417. FIG. 13 shows the deck slab image A captured at the initial position S. The deck slab image A shows the main girder 2 and the cross beam 3, and also shows a connection portion of the main girder 2 and the cross beam 3. The initial absolute position coordinate acquisition unit 417 performs image processing to acquire the initial absolute position coordinates in a case where the connection portion of the main girder 2 and the cross beam 3 in the deck slab image A is defined as the origin O and the center of the image of the deck slab image A is defined as the initial position S. The distance between the robot device 100 and the deck slab 6 is measured by the twin-lens camera 202, the laser distance sensor in the robot device 100, or the like.

Although an example where the initial absolute position coordinate acquisition unit 417 acquires the absolute coordinates of the initial position S of the robot device 100 has been described, the above-described method of the initial absolute position coordinate acquisition unit 417 is not limited to the acquisition of the absolute coordinates of the initial position S. That is, for example, the absolute coordinates of any position may be acquired using the same method as the initial absolute position coordinate acquisition unit 417, and the self position estimation device 400 may be made to estimate the self position based on the absolute coordinates. In this way, the self position estimation is performed based on the absolute coordinates of any position, whereby it is possible to correct accumulated errors of the self position estimation device 400.

The above-described example is an example where the first absolute position coordinates are calculated with the main girder 2 of the bridge 1 as the X axis, the cross beam 3 or the cross frame 4 of the bridge 1 as the Y axis, and the part where the main girder 2 and the cross beam 3 cross each other as the origin O of the absolute position coordinates. The invention is not limited to the example. For example, in a case of a structure other than the deck slab, objects of a structure to be marks perpendicular to each other at the origin O of the absolute coordinates with any point on the structure as the origin O of the absolute coordinates like the relationship between the main girder 2 and the cross beam 3 of the bridge 1 can be applied. For example, in a case where any point on the structure is defined as the origin O of the absolute coordinates, and the X axis and the Y axis are also defined, the first absolute position coordinates (initial absolute position coordinates) may be acquired by acquiring the distances from the first position (initial position) in the X-axis direction and the Y-axis direction in advance.

Third Embodiment

Next, a third embodiment of the invention will be described.

Figure 14:
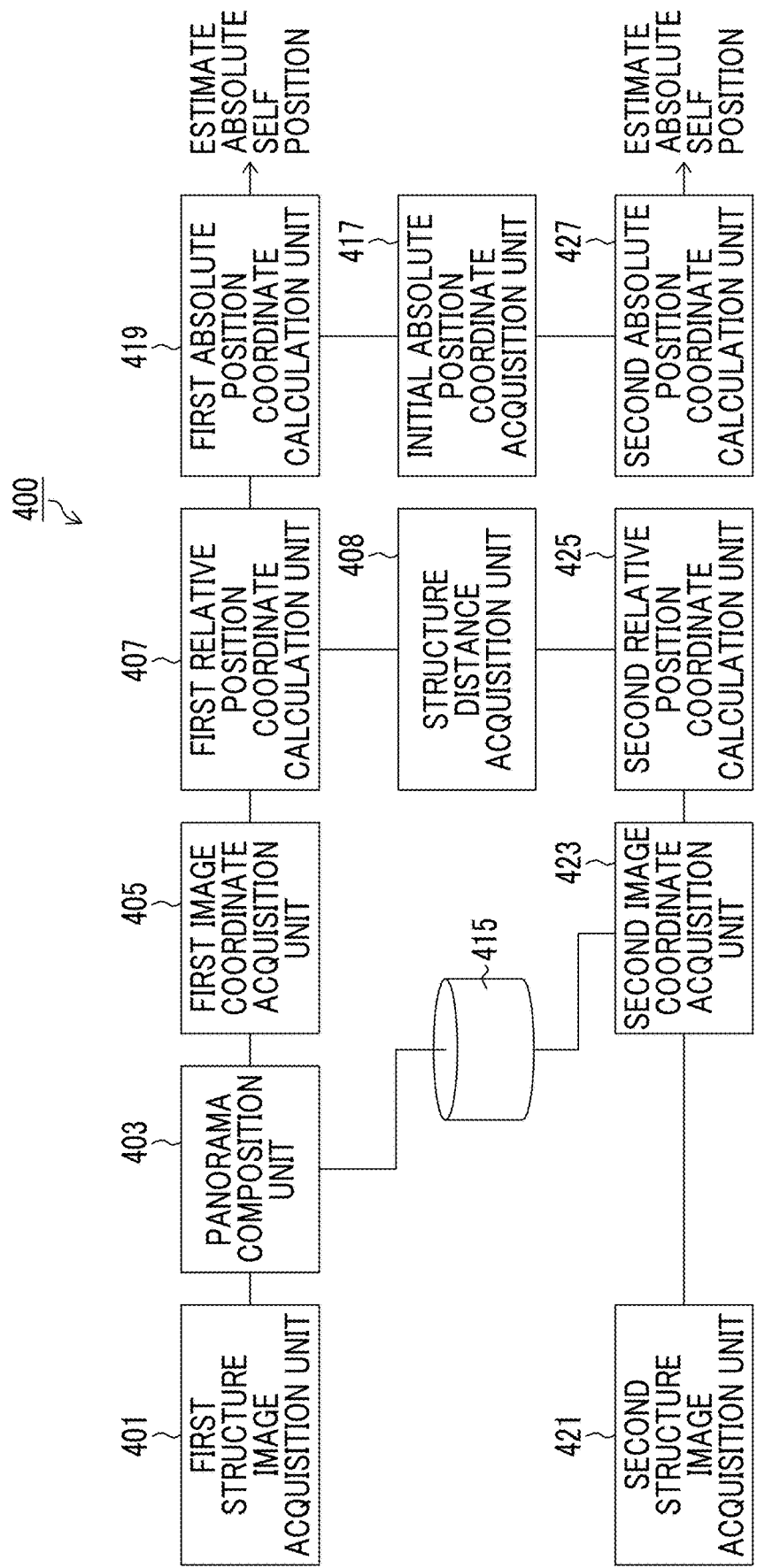
FIG. 14 is a block diagram showing a functional configuration example of the self position estimation device.

FIG. 14 is a block diagram showing a functional configuration example of a self position estimation device 400 of the embodiment. The self position estimation device 400 has a first structure image acquisition unit 401., a panorama composition unit 403, a first image coordinate acquisition unit 405, a first relative position coordinate calculation unit 407, a structure distance acquisition unit 408, a first absolute position coordinate calculation unit 419, an initial absolute position coordinate acquisition unit 417, a storage unit 415, a second structure image acquisition unit 421, a second image coordinate acquisition unit 423, a second relative position coordinate calculation unit 425, and a second absolute position coordinate calculation unit 427. The parts already described in FIGS. 6 and 11 are represented by the same reference numerals, and description thereof will not be repeated.

The storage unit 415 stores the panorama composite image obtained through panorama composition in the panorama composition unit 403. As described above, the panorama composite image generated in the panorama composition unit 403 can be used as a map as described in the embodiment in a case where the panorama composite image is generated once. Accordingly, the storage unit 415 stores the panorama composite image composed by the panorama composition unit 403, and reads the panorama composite image as needed.

The second structure image acquisition unit 421 moves the robot device 100 to a self position estimation position Q (third position) as any position where a deck slab image can be captured in the panorama composite image, and acquires a deck slab image (third deck slab image) obtained by subjecting the deck slab 6 to split imaging at the self position estimation position Q. That is, after the panorama composite image is composed once, the robot device 100 moves again within a range in which a deck slab image constituting the panorama composite image is captured, a deck slab image that is included in the panorama composite image is captured, and then, the second structure image acquisition unit 421 acquires the deck slab image. For example, in a case where the bridge 1 is inspected, the robot device 100 subjects the deck slab 6 to split imaging to generate a panorama composite image in an outward path, and captures a deck slab image of any part and estimates the imaging position (self position estimation position Q) in a return path.

The second image coordinate acquisition unit 423 collates the deck slab image acquired by the second structure image acquisition unit 421 with the panorama composite image, thereby acquiring third image coordinates as coordinates of a specific position of the third deck slab image with the first image coordinates as the origin O of the coordinate system of the panorama composite image. That is, the second image coordinate acquisition unit 423 reads the already composed panorama composite image from the storage unit 415 and collates the read panorama composite image with the deck slab image acquired by the second structure image acquisition unit 421 to acquire the third image coordinates. A known technique is applied to the collation in the second image coordinate acquisition unit 423.

The second relative position coordinate calculation unit 425 transforms the third image coordinates using the transformation coefficient from the image coordinate system to the actual coordinate system and calculates relative position coordinates as relative position coordinates of the self position estimation position Q as a relative self position. The transformation coefficient used herein is calculated as already described.

The second absolute position coordinate calculation unit 427 calculates third absolute position coordinates as absolute position coordinates of the third position as an absolute self position based on the relative position coordinates and the first absolute position coordinates. That is, similarly to the first absolute position coordinate calculation unit 419, the second absolute position coordinate calculation unit 427 acquires the first absolute position coordinates from the initial absolute position coordinate acquisition unit 417 to calculate the absolute position coordinates of the third position.

Figure 15:
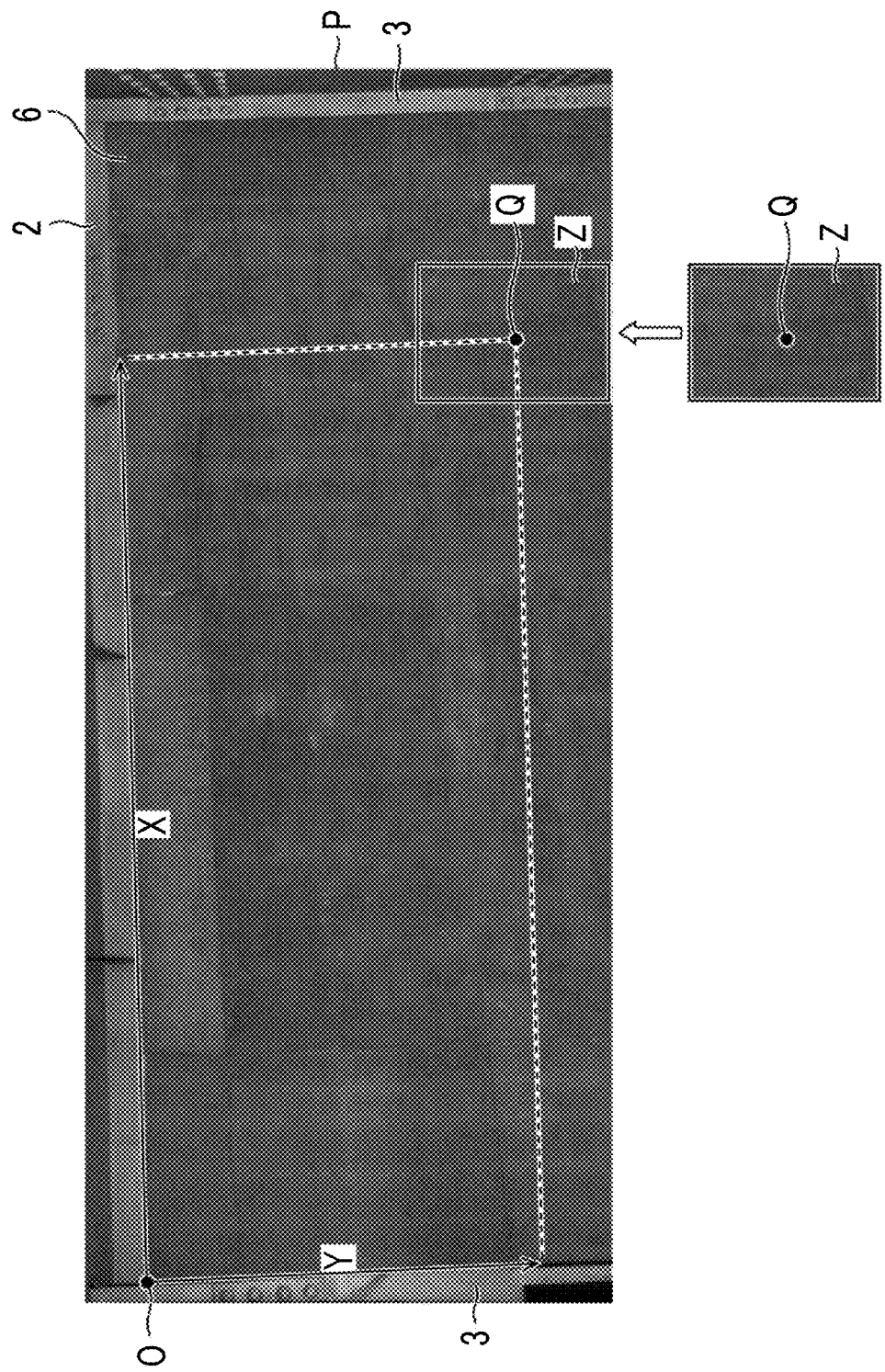
FIG. 15 is a diagram illustrating acquisition of third absolute position coordinates.

FIG. 15 is a diagram illustrating the acquisition of the third absolute position coordinates of the second absolute position coordinate calculation unit 427 of the embodiment.

FIG. 15 shows a panorama composite image P and a deck slab image Z within a range of the panorama composite image P. An image center Q of the deck slab image Z is a point corresponding to the self position estimation position Q, and the deck slab image Z is the third deck slab image. The second absolute position coordinate calculation unit 427 acquires absolute position coordinates of the image center Q of the deck slab image Z in the panorama composite image P acquired from the storage unit 415. In the panorama composite image P shown in FIG. 15, the connection portion of the main girder 2 and the cross beam 3 is set as the origin O, the X axis is set along the main girder 2, and the Y axis is set along the cross beam 3. The absolute position coordinates of the robot device 100 corresponding to the image center Q are calculated based on the image coordinates of the image center Q in the panorama composite image P.

In the above description, although a case where the bridge 1 is inspected by the single robot device 100 has been described, a method in which inspection is performed using two robot devices 100 is also considered. In this case, a first robot device 100 may create a panorama composite image using split deck slab images, and a following second robot device 100 may image a steel member while estimating the self position using the method of the embodiment depending on the panorama composite image (map) created by the first robot device 100.

Fourth Embodiment

Next, a fourth embodiment of the invention will be described.

Figure 16:
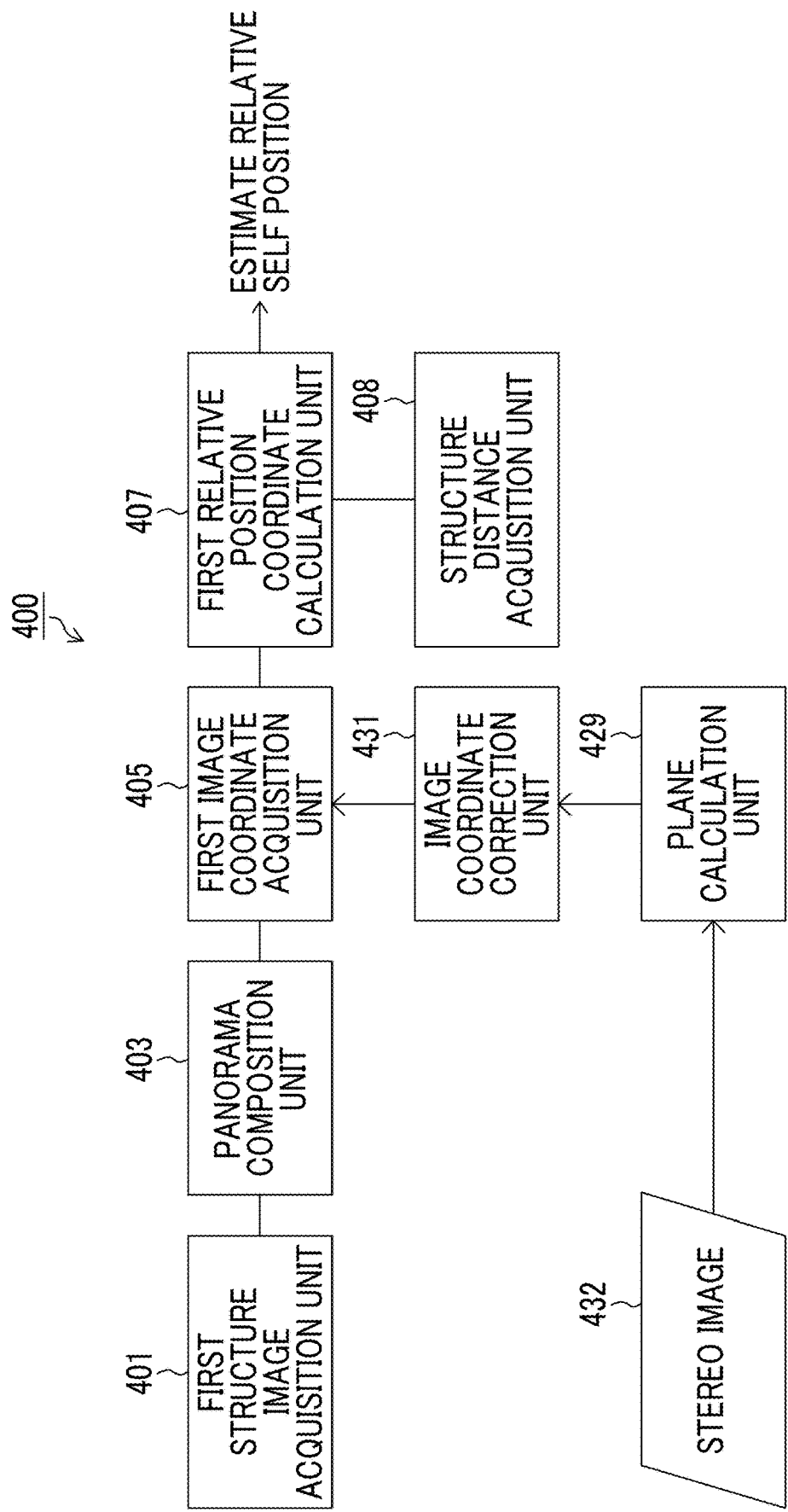
FIG. 16 is a block diagram showing a functional configuration example of the self position estimation device.

FIG. 16 is a block diagram showing a functional configuration example of a self position estimation device 400 of the embodiment. The self position estimation device 400 primarily has a first structure image acquisition unit 401, a panorama composition unit 403, a first image coordinate acquisition unit 405, a first relative position coordinate calculation unit 407, a structure distance acquisition unit 408, a plane calculation unit 429, and an image coordinate correction unit 431. The parts already described in FIG. 6 are represented by the same reference numerals, and description thereof will not be repeated.

The plane calculation unit 429 calculates a plane of the deck slab 6 using a stereo image 432 captured by the robot device 100. That is, the plane calculation unit 429 estimates a plane equation (normal vector) of the deck slab 6 based on the stereo image 432 captured by the twin-lens camera 202 of the robot device 100.

The image coordinate correction unit 431 corrects the second image coordinates based on the plane calculated by the plane calculation unit 429. That is, the image coordinate correction unit 431 corrects the second image coordinates acquired by the first image coordinate acquisition unit 405 based on the plane of the deck slab 6 calculated by the plane calculation unit 429. Although a case where the image coordinate correction unit 431 corrects the second image coordinates acquired by the first image coordinate acquisition unit 405 has been described in FIG. 16, the image coordinate correction unit 431 may correct the third image coordinates acquired by the second image coordinate acquisition unit 423.

Figure 17:
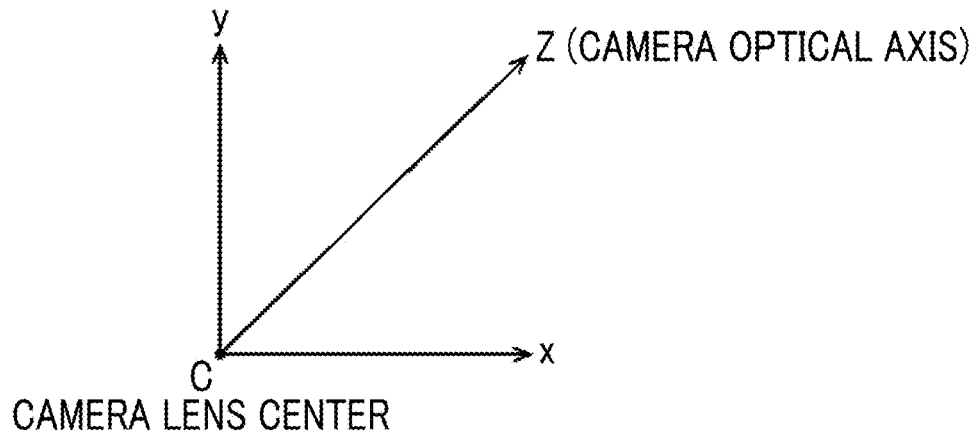
FIG. 17 is a conceptual diagram illustrating plane estimation.
Figure 18:
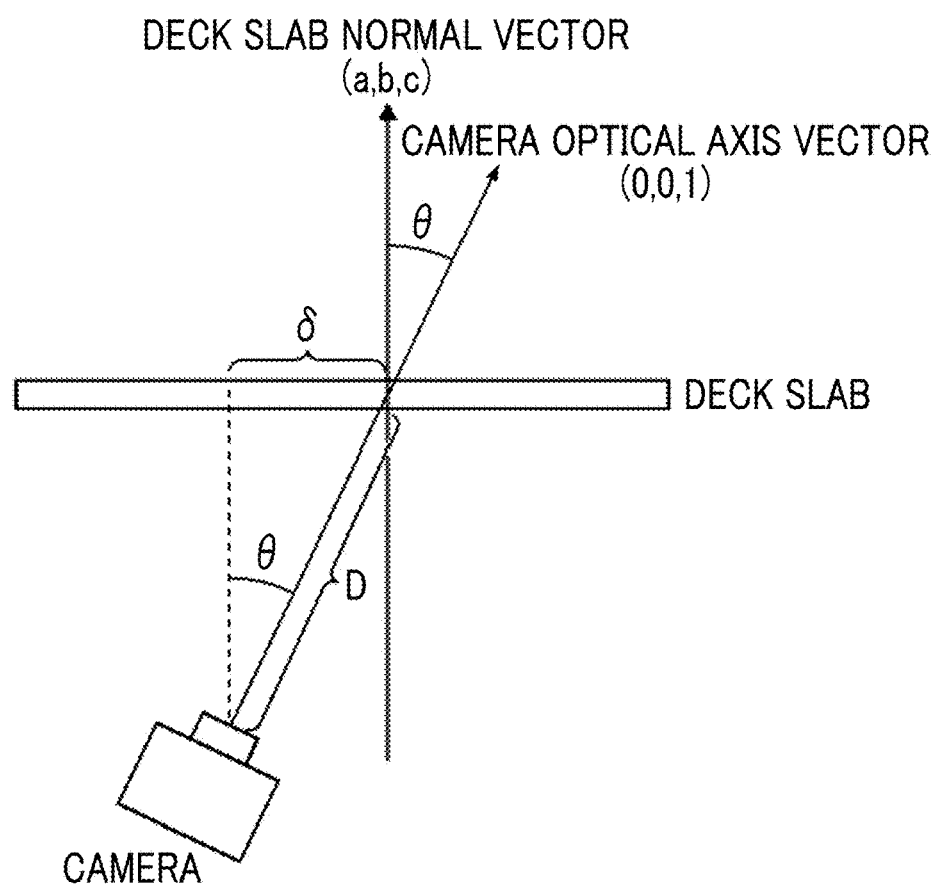
FIG. 18 is a diagram illustrating misregistration calculation according to an imaging angle.
Figure 19:
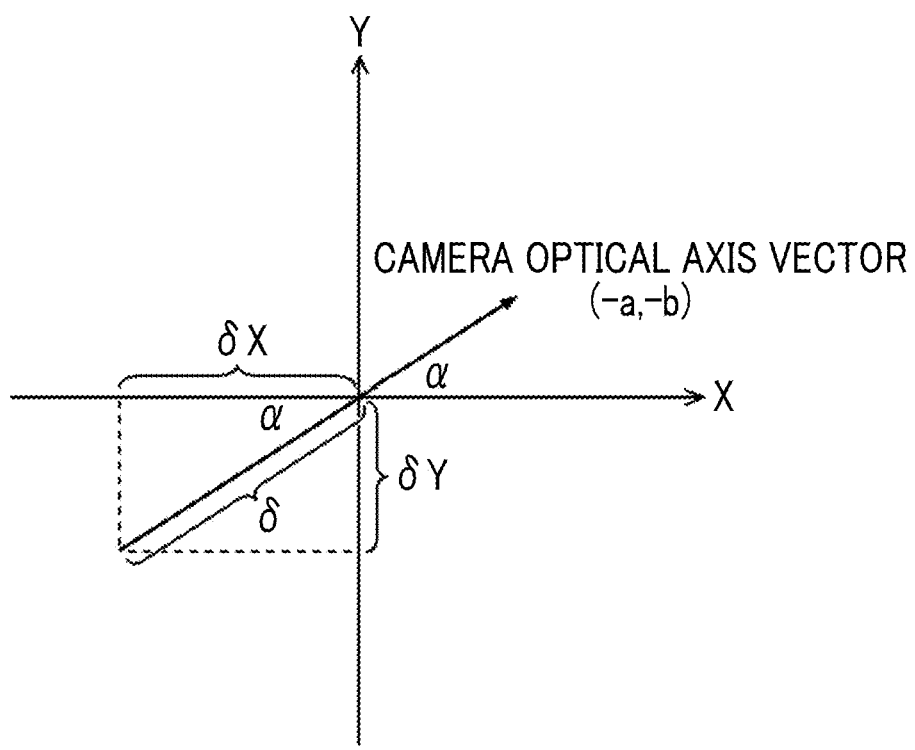
FIG. 19 is a diagram illustrating misregistration calculation according to the imaging angle.

Next, correction of an estimation position according to an imaging angle to be performed by the plane calculation unit 429 and the image coordinate correction unit 431 will be specifically described referring to FIGS. 17 to 19.

FIG. 17 is a conceptual diagram illustrating plane estimation that is performed by the plane calculation unit 429. In FIG. 17, x, y, and z represent the camera coordinate system, and the z axis represents the optical axis of the imaging device 200.

The plane calculation unit 429 performs parallelization of a left image and a right image in the stereo image 432 acquired by the imaging device 200, calculates parallax of the left image and the right image, and estimates three-dimensional coordinates, thereby calculating the following plane equation.

plane equation: $ax+by+cz+d=0$

FIGS. 18 and 19 are diagrams illustrating misregistration calculation according to an imaging angle.

FIG. 18 is a diagram of the bridge 1 when viewed from the side, and FIG. 19 is a diagram showing a deck of a horizontal plane of the bridge 1 when viewed from the above. In a case where a normal vector of a plane (deck slab 6) is (a,b,c), and a camera optical axis vector is (e,f,g)=(0, 0,1), an angle θ between the plane and the camera optical axis is obtained by the following expression.

$$\cos\theta = \frac{ae+bf+cg}{\sqrt{a^2+b^2+c^2}\sqrt{e^2+f^2+g^2}} = \frac{c}{\sqrt{a^2+b^2+c^2}}.$$

In a case where the distance between the twin-lens camera 202 and the deck slab 6 is D, a misregistration amount δ is obtained by δ=D×sin θ.

Next, as shown in FIG. 19, decomposition into misregistration amounts δX and δY in the X and Y directions of the absolute coordinates (panel coordinates) is performed. In a case where an angle between the X axis of the bridge coordinate system and the camera optical axis is a, decomposition into δX and δY can be performed.

tan α=b/a

δX=δ×cos α

δY=δ×sin α

The image coordinate correction unit 431 corrects the acquired image coordinates (a position where the center of the captured image is estimated as a camera position) (X,Y) using the misregistration amounts (δX, δY).

Fifth Embodiment

Next, a fifth embodiment of the invention will be described.

FIG. 20 is a block diagram showing a functional configuration example of a self position estimation device 400 of the embodiment. The self position estimation device 400 primarily has a first structure image acquisition unit 401, a panorama composition unit 403, a first image coordinate acquisition unit 405, a first relative position coordinate calculation unit 407, a structure distance acquisition unit 408, a composition accuracy evaluation unit 433, and an image blur determination unit 435. The parts already described in FIG. 6 are represented by the same reference numerals, and description thereof will not be repeated.

The composition accuracy evaluation unit 433 performs, using an image extracted from one image, template matching in another image in a superimposed region of the panorama composite image to evaluate composition accuracy in the superimposed region and determines whether or not the first image coordinate acquisition unit 405 is made to acquire the second image coordinates based on the evaluation. That is, the composition accuracy evaluation unit 433 evaluates the composition accuracy in the superimposed region of the panorama composite image, in a case where the composition accuracy is satisfactory, makes the first image coordinate acquisition unit start to acquire the image coordinates as it is, and in a case where the composition accuracy is not satisfactory, makes the image blur determination unit 435 starts to determine blur of the acquired deck slab image. Hereinafter, a method of composition accuracy evaluation to be performed by the composition accuracy evaluation unit 433 will be described.

First, the composition accuracy evaluation unit 433 extracts a plurality of template images having a certain size from an image i included in a superimposed region of images i and j. Next, the composition accuracy evaluation unit 433 performs template matching in the superimposed region of the image j using the template images extracted from the image i. Thereafter, a pixel deviation amount between an extraction position from the image i and a template matching result on the image j is calculated. Then, the composition accuracy evaluation unit 433 calculates an accuracy evaluation value (an average value, a maximum value, a standard deviation, or the like of pixel deviation amounts of a plurality of template matching results). Determination to be high accuracy or low accuracy of the composition accuracy evaluation unit 433 is performed based on a threshold value determined in advance according to position estimation accuracy or the like. It is desirable that error accumulation is also taken into consideration on the determination of the threshold.

As a specific example, in a case where an estimation error of the self position in a panel is set to be within 100 mm (including error accumulation), composition is performed five times in a panel long-side direction. In this case, a maximum allowable error per composition can be calculated 100 (mm)/5 (times)/0.375 (distance per pixel (min/pixel))=53.3 pixels. In a case where design is actually performed, the maximum allowable error per composition may be 50 pixels with a slight margin.

In a case where the result of the composition accuracy evaluation of the composition accuracy evaluation unit 433 is not satisfactory, the image blur determination unit 435 determines blur of the acquired deck slab image. The image blur determination unit 435 performs spatial frequency analysis on a plurality of deck slab images acquired by the first structure image acquisition unit 401 and determines Whether or not the first structure image acquisition unit 401 is made to acquire a deck slab image again based on a result of the spatial frequency analysis. Specifically, the image blur determination unit 435 performs spatial frequency analysis (FFT) on the deck slab images acquired by the first structure image acquisition unit 401 to determine the presence or absence of a high-frequency component. The image blur determination unit 435 determines to be an image with no blur in a case where the high-frequency component is present, and determines to be a blurred image in a case where the high-frequency component is absent. The presence or absence of the high-frequency component is determined based on a threshold value, and the threshold value can be determined in advance by analyzing previous deck slab images. In a case where the determination result of the image blur determination unit 435 is that the deck slab image is a blurred image, the robot device 100 captures a deck slab image again. In this case, the imaging condition and the like of the imaging device 200 are appropriately adjusted. In a case where the determination result of the image blur determination unit 435 is that the deck slab image is not a blurred image, since there is a possibility that the composition overlap width of the deck slab images at the time of panorama composition is not sufficient, the robot device 100 is moved (retreated or advanced) and reimaging is performed.

Although the example of the invention has been described above, the invention is not limited to the above-described embodiments, and may have various modifications without departing from the spirit of the invention.

EXPLANATION OF REFERENCES

1: bridge
2: main girder
3: cross beam
4: cross frame
5: lateral frame
6: deck slab
10: inspection system
100: robot device
p 102: main frame
104: vertical telescopic arm
104A: camera mounting portion
106: housing
108: X-direction drive unit
108A: ball screw
108B: ball nut
108C: motor
110: Y-direction drive unit
110A: tire
110B: tire
112: Z-direction drive unit
120: pan/tilt mechanism
130: robot control unit
200: imaging device
202: twin-lens camera
202A: first imaging unit
202B: second imaging unit
204: imaging control unit
206: pan/tilt drive unit
210: pan/tilt control unit
230: robot-side communication unit
250: imaging element
300: terminal device
310: terminal-side communication unit
320: terminal control unit
330: input unit
340: display unit
350: recording unit
400: self position estimation device
401: first structure image acquisition unit
403: panorama composition unit
405: first image coordinate acquisition unit
407: first relative position coordinate calculation unit
408: structure distance acquisition unit
415: storage unit
417: initial absolute position coordinate acquisition unit
419: first absolute position coordinate calculation unit
421: second structure image acquisition unit
423: second image coordinate acquisition unit
425: second relative position coordinate calculation unit
427: second absolute position coordinate calculation unit
429: plane calculation unit
431: image coordinate correction unit
432: stereo image
433: composition accuracy evaluation unit
435: image blur determination unit
A to Z: deck slab image
P: panorama composite image
Step S10 to Step S17: self position estimation step

What is claimed is:

1. A self position estimation device that estimates a self position of a camera-equipped mobile robot performing inspection of a structure by subjecting the structure to split imaging, the self position estimation device comprising:
a processor configured to cause the device to:
acquire a plurality of structure images including at least a first structure image obtained by subjecting the structure to split imaging at a first position with the camera-equipped mobile robot and a second structure image obtained by subjecting the structure to split imaging at a second position with the camera-equipped mobile robot after the camera-equipped mobile robot moves along an imaging plan from the first position; and
generate a panorama composite image by subjecting the plurality of structure images including the first structure image and the second structure image to panorama composition;
a storage unit that stores the panorama composite image;
the processor being further configured to cause the device to:
acquire second image coordinates as coordinates of a specific position of the second structure image on the panorama composite image based on a moving distance of the camera-equipped mobile robot on the panorama composite image with first image coordinates corresponding to the first position in the panorama composite image which is read from the storage unit as an origin of a coordinate system of the panorama composite image;
calculate a normal vector of a plane of the structure using a stereo image captured by the camera-equipped mobile robot;
correct the second image coordinates using a misregistration amount which is an amount from a center of the second structure image which is estimated as a camera position; and
calculate relative position coordinates as relative actual coordinates of the second position as a relative self position using a transformation coefficient for transforming the second image coordinates from an image coordinate system to an actual coordinate system, the transformation coefficient being calculated from an imaging range divided by a number of pixels of an image captured by the camera, and the imaging range being calculated from a distance between the camera and the structure, a focal length of the camera, and a size of an imaging element of the camera.

2. The self position estimation device according to claim 1, wherein the processor is configured to cause the device to:
make the camera-equipped mobile robot move to a third position as any position in the panorama composite image where a structure image is to be captured and acquire a third structure image obtained by subjecting the structure to split imaging at the third position;
collate the third structure image with the panorama composite image to acquire third image coordinates as coordinates of a specific position of the third structure image with the first image coordinates as the origin of the coordinate system of the panorama composite image; and
transform the third image coordinates using the transformation coefficient from the image coordinate system to the actual coordinate system to calculate relative position coordinates as relative position coordinates of the third position as a relative self position.

3. The self position estimation device according to claim 1, wherein the processor is configured to cause the device to:
acquire first absolute position coordinates as absolute position coordinates of the first position using distance information between the first position and an origin of absolute position coordinates set on the structure in an X-axis direction and distance information between the first position and the origin of the absolute position coordinates in a Y-axis direction; and
calculate second absolute position coordinates as absolute position coordinates of the second position as an absolute self position based on the relative position coordinates and the first absolute position coordinates.

4. The self position estimation device according to claim 2, wherein the processor is configured to cause the device to:
acquire first absolute position coordinates as absolute position coordinates of the first position using distance information between the first position and an origin of absolute position coordinates set on the structure in an X-axis direction and distance information between the first position and the origin of the absolute position coordinates in a Y-axis direction; and
calculate second absolute position coordinates as absolute position coordinates of the second position as an absolute self position based on the relative position coordinates and the first absolute position coordinates.

5. The self position estimation device according to claim 2, wherein the processor is configured to cause the device to:
acquire first absolute position coordinates as absolute position coordinates of the first position using distance information between the first position and an origin of absolute position coordinates set on the structure in an X-axis direction and distance information between the first position and the origin of the absolute position coordinates in a Y-axis direction; and
calculate third absolute position coordinates as absolute position coordinates of the third position as an absolute self position based on the relative position coordinates and the first absolute position coordinates.

6. The self position estimation device according to claim 3, wherein the processor is configured to cause the device to acquire a distance between the first position and the X axis, a distance between the first position and the Y axis, and a distance between the first position and the structure with a distance measurement device in the camera-equipped mobile robot to acquire the first absolute position coordinates.

7. The self position estimation device according to claim 4, wherein the processor is configured to cause the device to acquire a distance between the first position and the X axis, a distance between the first position and the Y axis, and a distance between the first position and the structure with a distance measurement device in the camera-equipped mobile robot to acquire the first absolute position coordinates.

8. The self position estimation device according to claim 5, wherein the processor is configured to cause the device to acquire a distance between the first position and the X axis, a distance between the first position and the Y axis, and a distance between the first position and the structure with a distance measurement device in the camera-equipped mobile robot to acquire the first absolute position coordinates.

9. The self position estimation device according to claim 3, wherein the processor is configured to cause the device to acquire a distance between the first position and the X axis and a distance between the first position and the Y axis from an image captured by the camera-equipped mobile robot, and acquire a distance between the first position and the structure with a distance measurement device in the camera-equipped mobile robot to acquire the first absolute position coordinates.

10. The self position estimation device according to claim 4, wherein the processor is configured to cause the device to acquire a distance between the first position and the X axis and a distance between the first position and the Y axis from an image captured by the camera-equipped mobile robot, and acquire a distance between the first position and the structure with a distance measurement device in the camera-equipped mobile robot to acquire the first absolute position coordinates.

11. The self position estimation device according to claim 5, wherein the processor is configured to cause the device to acquire a distance between the first position and the X axis and a distance between the first position and the Y axis from an image captured by the camera-equipped mobile robot, and acquire a distance between the first position and the structure with a distance measurement device in the camera-equipped mobile robot to acquire the first absolute position coordinates.

12. The self position estimation device according to claim 2, wherein the processor is configured to cause the device to:
calculate the plane of the structure using the stereo image captured by the camera-equipped mobile robot; and
correct the third image coordinates based on the calculated plane.

13. The self position estimation device according to claim 1, wherein the processor is configured to cause the device to:
perform, in a superimposed region of the panorama composite image, an evaluation of composition accuracy in the superimposed region and perform a determination regarding whether or not the processor is made to acquire the second image coordinates based on the evaluation.

14. The self position estimation device according to claim 1, wherein the processor is configured to cause the device to:
perform spatial frequency analysis on the plurality of structure images acquired by the first structure image acquisition unit and performs determination regarding whether or not the processor is made to acquire the structure images again based on a result of the spatial frequency analysis.

15. An image processing device comprising:
the self position estimation device according to claim 1.

16. A self position estimation method that estimates a self position of a camera-equipped mobile robot performing inspection of a structure by subjecting the structure to split imaging, the self position estimation method comprising:
acquiring a plurality of structure images including at least a first structure image obtained by subjecting the structure to split imaging at a first position with the camera-equipped mobile robot and a second structure image obtained by subjecting the structure to split imaging at a second position with the camera-equipped mobile robot after the camera-equipped mobile robot moves along an imaging plan from the first position;
generating a panorama composite image by subjecting the plurality of structure images including the first structure image and the second structure image to panorama composition;
storing, by a storage unit, the panorama composite image;
acquiring second image coordinates as coordinates of a specific position of the second structure image on the panorama composite image based on a moving distance of the camera-equipped mobile robot on the panorama composite image with first image coordinates corresponding to the first position in the panorama composite image which is read from the storage unit as an origin of a coordinate system of the panorama composite image;
calculating a normal vector of a plane of the structure using a stereo image captured by the camera-equipped mobile robot;
correcting the second image coordinates using a misregistration amount which is an amount from a center of the second structure image which is estimated as a camera position; and
calculating relative position coordinates as relative actual coordinates of the second position as a relative self position using a transformation coefficient for transforming the second image coordinates from an image coordinate system to an actual coordinate system, the transformation coefficient being calculated from an imaging range divided by a number of pixels of an image captured by the camera, and the imaging range being calculated from a distance between the camera and the structure, a focal length of the camera, and a size of an imaging element of the camera.

17. A non-transitory computer-readable tangible medium comprising computer executable instructions stored thereon, which, when executed by one or more processors, cause the one or more processors to perform a self position estimation method that estimates a self position of a camera-equipped mobile robot performing inspection of a structure by subjecting the structure to split imaging, the self position estimation method comprising:
acquiring a plurality of structure images including at least a first structure image obtained by subjecting the structure to split imaging at a first position with the camera-equipped mobile robot and a second structure image obtained by subjecting the structure to split imaging at a second position with the camera-equipped mobile robot after the camera-equipped mobile robot moves along an imaging plan from the first position;
generating a panorama composite image by subjecting the plurality of structure images including the first structure image and the second structure image to panorama composition;
storing, by a storage unit, the panorama composite image;
acquiring second image coordinates as coordinates of a specific position of the second structure image on the panorama composite image based on a moving distance of the camera-equipped mobile robot on the panorama composite image with first image coordinates corresponding to the first position in the panorama composite image which is read from the storage unit as an origin of a coordinate system of the panorama composite image;
calculating a normal vector of a plane of the structure using a stereo image captured by the camera-equipped mobile robot;
correcting the second image coordinates using a misregistration amount which is an amount from a center of the second structure image which is estimated as a camera position; and
calculating relative position coordinates as relative actual coordinates of the second position as a relative self position using a transformation coefficient for transforming the second image coordinates from an image coordinate system to an actual coordinate system, the transformation coefficient being calculated from an imaging range divided by a number of pixels of an image captured by the camera, and the imaging range being calculated from a distance between the camera and the structure, a focal length of the camera, and a size of an imaging element of the camera.

18. The self position estimation device according to claim 13, wherein the processor is configured to cause the device to:
perform, using an image extracted from one image, template matching in another image in the superimposed region of the panorama composite image to evaluate the composition accuracy in the superimposed region.

19. The self position estimation method according to claim 16, further comprising:
performing, in a superimposed region of the panorama composite image, an evaluation of composition accuracy in the superimposed region and performing a determination regarding whether or not the processor is made to acquire the second image coordinates based on the evaluation.

20. The non-transitory computer-readable tangible medium according to claim 17, the self position estimation method further comprising:
performing, in a superimposed region of the panorama composite image, an evaluation of composition accuracy in the superimposed region and performing a determination regarding whether or not the processor is made to acquire the second image coordinates based on the evaluation.

* * * * *